(12) United States Patent
Allen

(10) Patent No.: US 7,300,014 B2
(45) Date of Patent: Nov. 27, 2007

(54) CENTERLESS AND OPENABLE TOOL CARRIER FOR PROCESSING OF COMPLEX SHAPES

(75) Inventor: Abraham Keith Allen, Provo, UT (US)

(73) Assignee: Lotus Designs, LLC, Provo, UT (US)

( * ) Notice: Subject to any disclaimer, the term of this patent is extended or adjusted under 35 U.S.C. 154(b) by 0 days.

(21) Appl. No.: 11/328,864

(22) Filed: Jan. 10, 2006

(65) Prior Publication Data
US 2006/0175454 A1 Aug. 10, 2006

Related U.S. Application Data

(60) Provisional application No. 60/642,790, filed on Jan. 11, 2005.

(51) Int. Cl.
*B21C 47/14* (2006.01)
(52) U.S. Cl. .................................................. 242/439.5
(58) Field of Classification Search ................ 242/437, 242/437.1, 438.1, 439, 439.5, 439.6; 29/596, 29/605
See application file for complete search history.

(56) References Cited

U.S. PATENT DOCUMENTS

| 3,642,215 | A | * | 2/1972 | Bishop et al. ............... 242/439 |
| 3,799,462 | A | * | 3/1974 | Fahrbach .................. 242/434.9 |
| 4,768,725 | A | * | 9/1988 | Daines et al. ............. 242/434.5 |
| 4,771,957 | A | * | 9/1988 | Schlake et al. .......... 242/437.1 |

OTHER PUBLICATIONS

Ruff Inc., All you need for toroidal winding, brochure, 2002.
M. Tari, K. Yoshida, S. Sekito, A High Voltage Insulating System with Increased Thermal Conductivity for Turbo Generators, Coil Winding, Insulation & Electrical Manufacturing, International Conference, Berlin, Germany, Jun. 2001, pp. 49-53.

* cited by examiner

*Primary Examiner*—Emmanuel M Marcelo
(74) *Attorney, Agent, or Firm*—Kirton & McConkie; Michael F. Krieger

(57) ABSTRACT

An apparatus, and method for laying up structural filaments. The apparatus includes an openable race providing a circular path for a carrier bearing a filament source. The carrier moves circumferentially within the race and may be formed as a centerless wheel. The carrier may be formed in sections to facilitate opening of the race to insert a workpiece.

9 Claims, 40 Drawing Sheets

CENTERLESS AND OPENABLE TOOL CARRIER FOR PROCESSING OF COMPLEX SHAPES

RELATED APPLICATION

This application claims the priority to U.S. Provisional Patent Application Ser. No. 60/642,790 filed Jan. 11, 2005 and entitled THE LOTUS MACHINE—A CENTER-LESS AND OPENABLE WHEEL TO BE USED FOR MANUFACTURING, PROCESSING, AND ANALYSIS OF LINEAR AND COMPLEX SHAPES.

THE FIELD OF THE INVENTION

The invention relates generally to methods and apparatus for controlling automatic tools and more particularly to tools for winding or wrapping objects.

BACKGROUND

Composite materials are the latest generation of lightweight and extremely strong materials. Currently, most military and commercial aircraft include large amounts of composite materials to achieve a strong, lightweight structure. However, the full potential of composite materials has not yet been realized in many commercial applications.

A typical composite material includes an extremely strong fiber, such as fiber glass, carbon (or graphite) fiber, boron fiber, KEVLAR®, or the like, suspended within a matrix, which is typically made of a polymer resin, such as epoxy. The matrix is typically much weaker structurally than the fiber.

The most common composite materials include short sections of chopped fiber mixed in with a resin. The resin-fiber mixture can be easily sprayed or smeared on a form to create a wide variety of shapes, such as fiberglass boat hulls. Such "engineering composites," as they are called, offer flexibility and ease of use but fail to capture the full strength of the fiber. The composite is limited by the relative weakness of the resin matrix in which the fiber is suspended.

"Advanced composites" seek to remedy this problem by using continuous fibers wrapped around a form or mandrel. Advanced composites also seek to align the fibers such that their load bearing capacity is improved. Prior apparatus and methods for forming advanced composites are very limited in the shapes that may be made therewith. The principle limitation stems from the fact that prior systems rotate the part relative to a spool of filament. Shapes having closed loops, substantially closed loops, sharp angles, and branches are all impossible to wrap with a continuous filament where the workpiece is rotated. At higher speeds in particular, such shapes are eccentric and prone to vibration. Typically, parts made using prior systems are symmetric about a single axis and substantially straight, such as tubes or cylindrical tanks.

A "centerless wheel" approach has been used in the field of composites for in situ wrapping of roadway support pillars and for other large, straight structural members. In the centerless wheel method, a filament source moves within a circular race, or "centerless wheel," surrounding the part. Such apparatus typically require that the entire workpiece pass through a permanently closed race around which the filament source moves or to which the filament source is mounted. Accordingly, shapes having closed loops, substantially closed loops, and branches cannot pass through the race. Other apparatus require extensive setup operations to assemble the circular race around the part to be wrapped and therefore are only practicably used for large straight shapes.

In other fields, tape and wire are applied to toroids and other shapes by mounting the tape or wire source to a circular carrier mounted within the circular race. Some of these systems provide a small gap in the carrier which is allignable with a corresponding gap in the race to permit insertion of a part. However, the small size of the gap limits the size of the part that may be processed. Furthermore, such systems have not been used in the field of composites.

In view of the foregoing, what is needed is a winding apparatus for laying continuous strands of composite material on structural members, including branched, closed loop, substantially closed loop, and sharply angled portions. The race should be readily opened and closed. The race when opened should allow insertion of parts occupying substantially all of the area encircled by the centerless race. It would be a further advancement in the art to provide such an apparatus that may be readily opened is and closed during the processing of an individual part to accommodate parts of varying size and structure.

SUMMARY OF THE INVENTION

An apparatus for laying up filaments includes a race having a fixed portion secured to a support structure and defining a first arcuate path forming a first angular portion of a circular path. A hinged portion secures to the fixed portion and defines a second arcuate path forming a second angular portion of the circular path. A carrier is positioned within the circular path. The carrier may include a first carrier portion sized to occupy a substantial portion of the first arcuate path and a second carrier portion sized to occupy a substantial portion of the second arcuate path. A driver is secured to the fixed portion and sequentially engages the first and second carrier portions to move the first and second carrier portions within the circular path. A filament source mounts to the carrier and dispenses filament for winding a workpiece positioned within the apparatus.

In one method for using the invention, the hinged portion is pivoted away from the fixed portion. A branched or closed structure is positioned within the apparatus. The hinged portion is pivoted downwardly to complete the circular path. The driver actuates the carrier to revolve the filament source around the closed or branched structure. To wind the various branches of the branched structure, the hinged portion may be opened and closed to enable positioning of the various branches within the apparatus.

These and other features and advantages of the present invention will be set forth or will become more fully apparent in the description that follows. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

The operation and functionality of the invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, may be arranged and designed in a wide variety of different configurations. Thus, the following more detailed description of the embodiments of the system and method of the present invention, as represented in FIGS. 1 through 24, is not intended to limit the scope of the invention, as claimed, but it is merely representative of the presently preferred embodiments of the invention. The presently preferred embodiments of the invention will be best understood by reference to the drawings, wherein like parts are designated by like numerals throughout.

Figure 1:
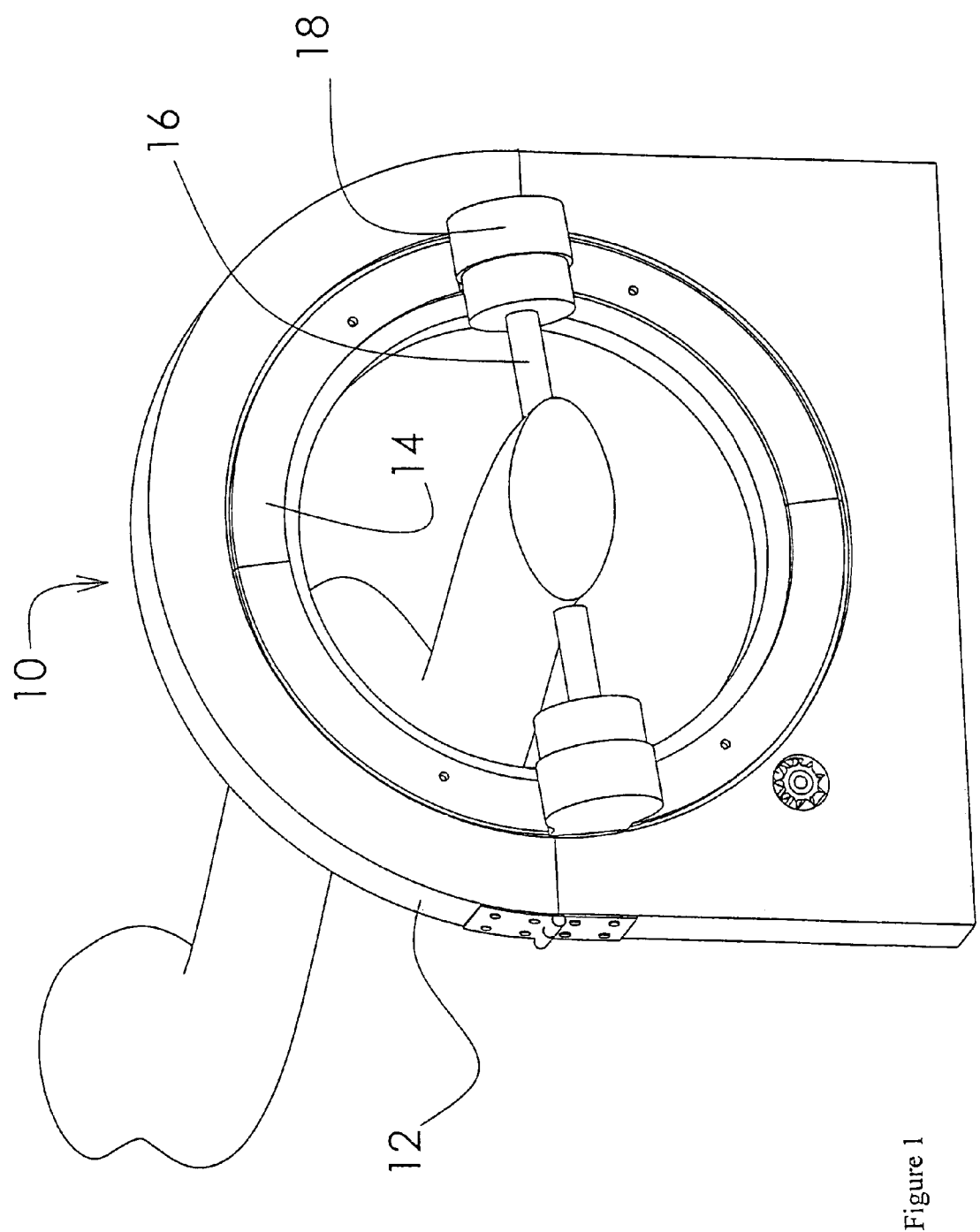
FIG. 1 is a perspective view of a centerless race and tool carrier, in accordance with the present invention.

Referring to FIG. 1, an apparatus 10 may include a race 12 and a carrier 14. In some embodiments of the present invention, the race 12 defines a circular path to guide the movement of the carrier 14. In other embodiments, the race defines non-circular paths, such as oval and rectangular. However, the shape of the race's 12 path is not limited to these listed shapes and can be any shape one skilled in the art would find useful. The carrier 14 may have one or more tools 16 mounted thereto. In some embodiments, actuators 18 mount the tools 16 to the carrier 14. A non-limiting list of actuators one skilled in the art could use includes motors, solenoids, and the like, for causing rotational and/or translational motion of the tools 16. The tools 18 may be filament sources for winding or wrapping. Alternatively, the tools 16 may be suitable for milling, drilling, grinding, sanding, cutting, severing, or polishing. In other embodiments, a tool 16 may be a print-head for printing bar codes and the like or for depositing conductive traces. In still other embodiments, the tool 16 is an automated manufacturing tool such as a welder, part placement tool, or an articulated arm. Thus, it is evident that one skilled in the art could use a broad variety of tools as tool 16 of the present invention.

Figure 2:
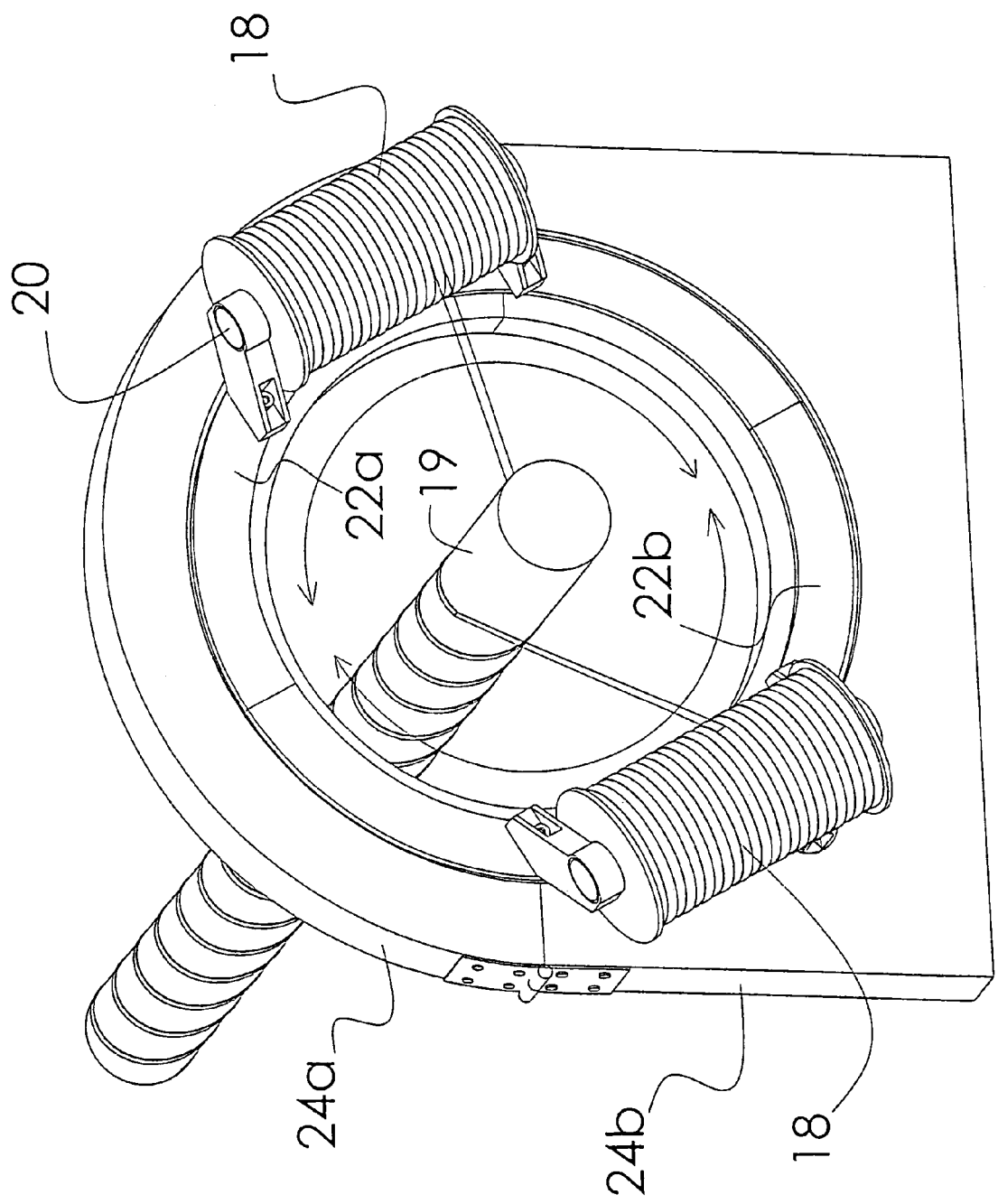
FIG. 2 is a perspective view of a centerless race and tool carrier having a filament source mounted thereto, in accordance with the present invention.

The embodiment shown in FIG. 2 depicts spool 18 as the tool 16. Other related embodiments include tools 16 that also have structures for storing filaments. The spool 18 may store filaments such as fiberglass, carbon fiber, pre-pregnated carbon fiber, boron fiber, KEVLAR, or the like. In this embodiment, the spool 18 is mounted on a spindle 20 enabling rotation of the spool 18, such that the spool 18 releases filament as the filament is drawn toward the center of the race 12. In this embodiment, a free end of the filament is bound to a workpiece 19 at the center of the race such that filament is wound around the workpiece 19 as the race 12 is rotated, drawing filament from the spool 18. In other embodiments, the filament is bound to workpiece 19 at positions other than the center of the race 12. In some embodiments, the speed at which the carrier 14 is rotating and the speed at which the workpiece is fed through the carrier 14 determines the angle of the filament relative to the workpiece 19. For example, at slow feed rates and high carrier rotation speeds, windings may be closer to perpendicular to a feed direction of the workpiece 19. At high feed rates and low carrier rotation speeds windings will be closer to parallel to a feed direction of the workpiece 19.

Figure 3:
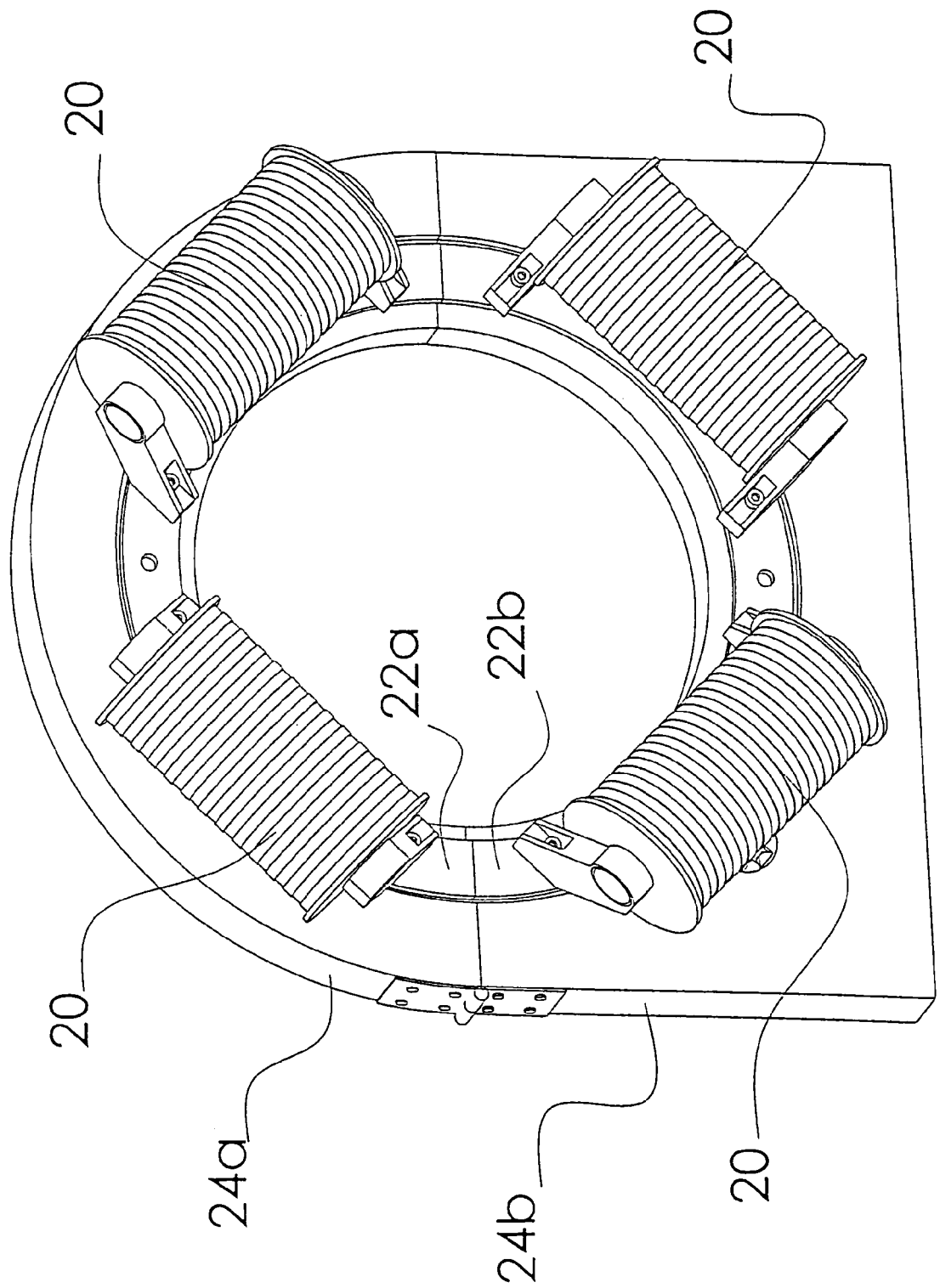
FIG. 3 is a perspective view of a centerless race and tool carrier having multiple; filament sources mounted thereto, in accordance with the present invention.

In the embodiment shown in FIG. 2, the spindle 20, or spool 18 is secured to the carrier 14. In this embodiment, the carrier 14 includes two or more sections 22a, 22b, which, when combined, form a circular structure. Other embodiments include more sections. The race 12 also includes two sections 24a, 24b forming a circular structure in this embodiment but includes more sections in other embodiments. The sections 24a, 24b forming the race 12 are fastened and unfastened from one another to permit insertion of workpieces 19 into the apparatus 10. The sections 24a, 24b of the carrier 14 are free to move within the race 12 and remain unfastened to one another. In this embodiment, a spindle 20 is secured to each section 22a, 22b. The embodiment of FIG. 3 depicts one instance where more than two spindles 20 are secured to each section 22a, 22b. In other embodiments, an apparatus 10 includes a single spindle 20 secured to either one of the sections 22a, 22b.

Figure 4:
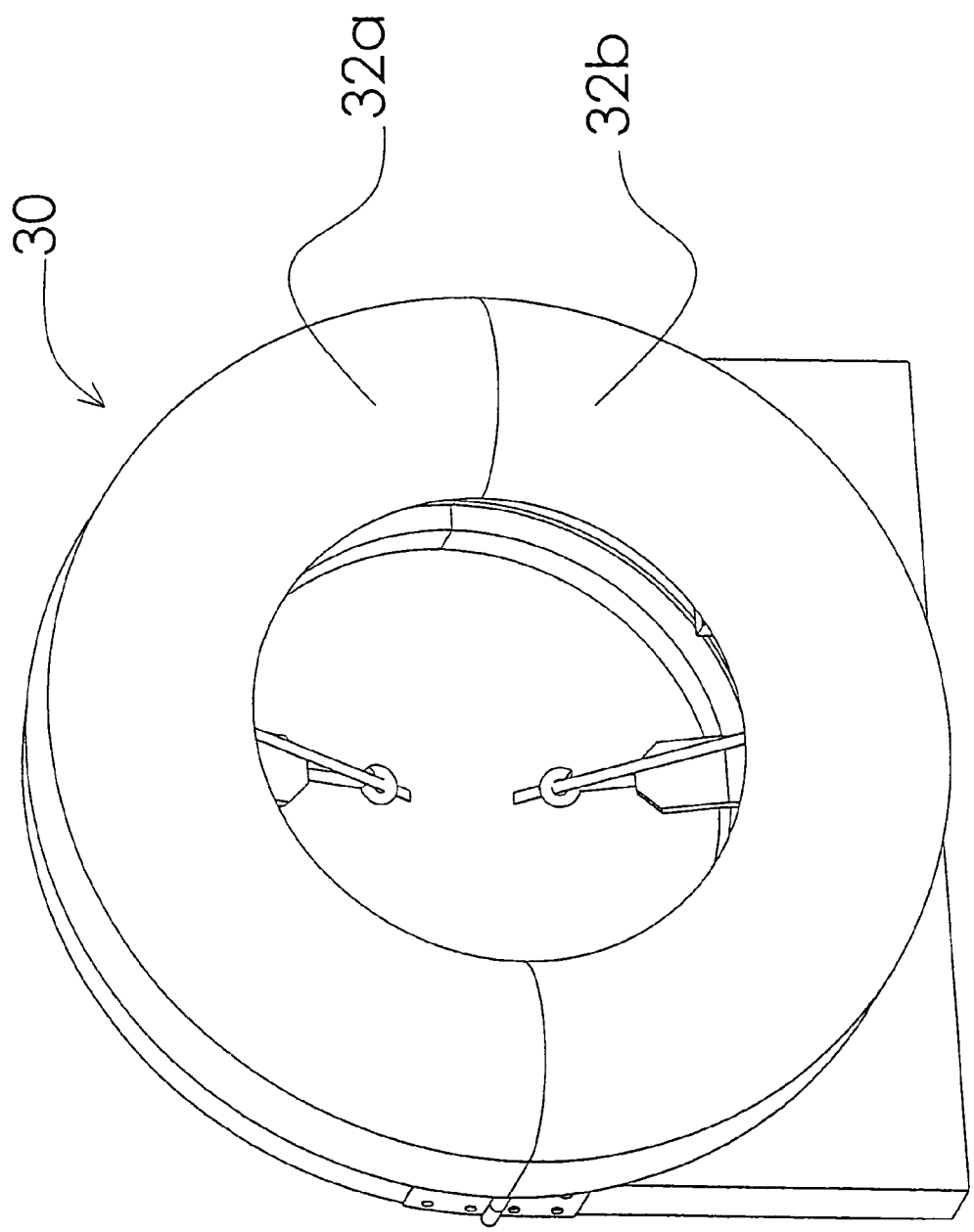
FIG. 4 is a perspective view of a race and carrier mounted within a shroud, in accordance with the present invention.

Referring to FIG. 4, in some embodiments a shroud 30 may surround the race 12, carrier 14, and spindles 20. The shroud 30 may serve to protect operators and workpieces 19 from damage from the rotating spindles 20 which sometimes protrude from the carrier 12. The shroud 30 may include separate sections 32a, 32b that are separable to permit separation of the sections 24a, 24b forming the race 12. In some embodiments the sections 32a, 32b secure directly to the sections 24a, 24b, respectively.

Figure 5:
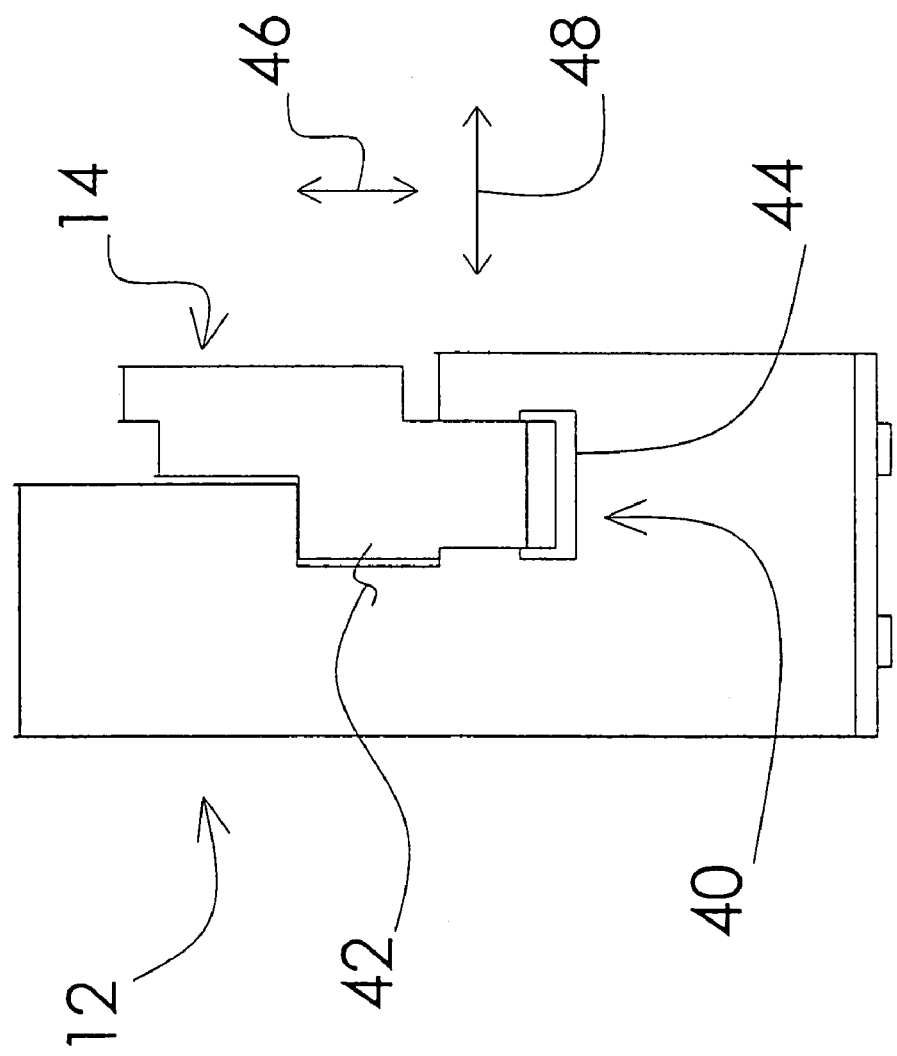
FIG. 5 is a cross-sectional view of a race and carrier, in accordance with an embodiment of the present invention.

Referring to the embodiment of FIG. 5, the race 12 has a guide 40 formed therein, or secured thereto. The carrier 14 may have a key 42, or like structure, which engages the guide 40 such that the carrier is constrained to rotational movement within the guide 40. The guide 40 may be embodied as a groove or rail formed on the sides, inside surface, or outside surface, of the race 12. In the illustrated embodiment, the guide 40 is a groove 44 formed on the side of the carrier 14. The guide 40 may have the cross section illustrated in FIG. 5 shaped to retain the key 42 in both the radial direction 46 and the lateral direction 48, while permitting sliding of the key 42 circumferentially within the guide 40.

Figure 6A:
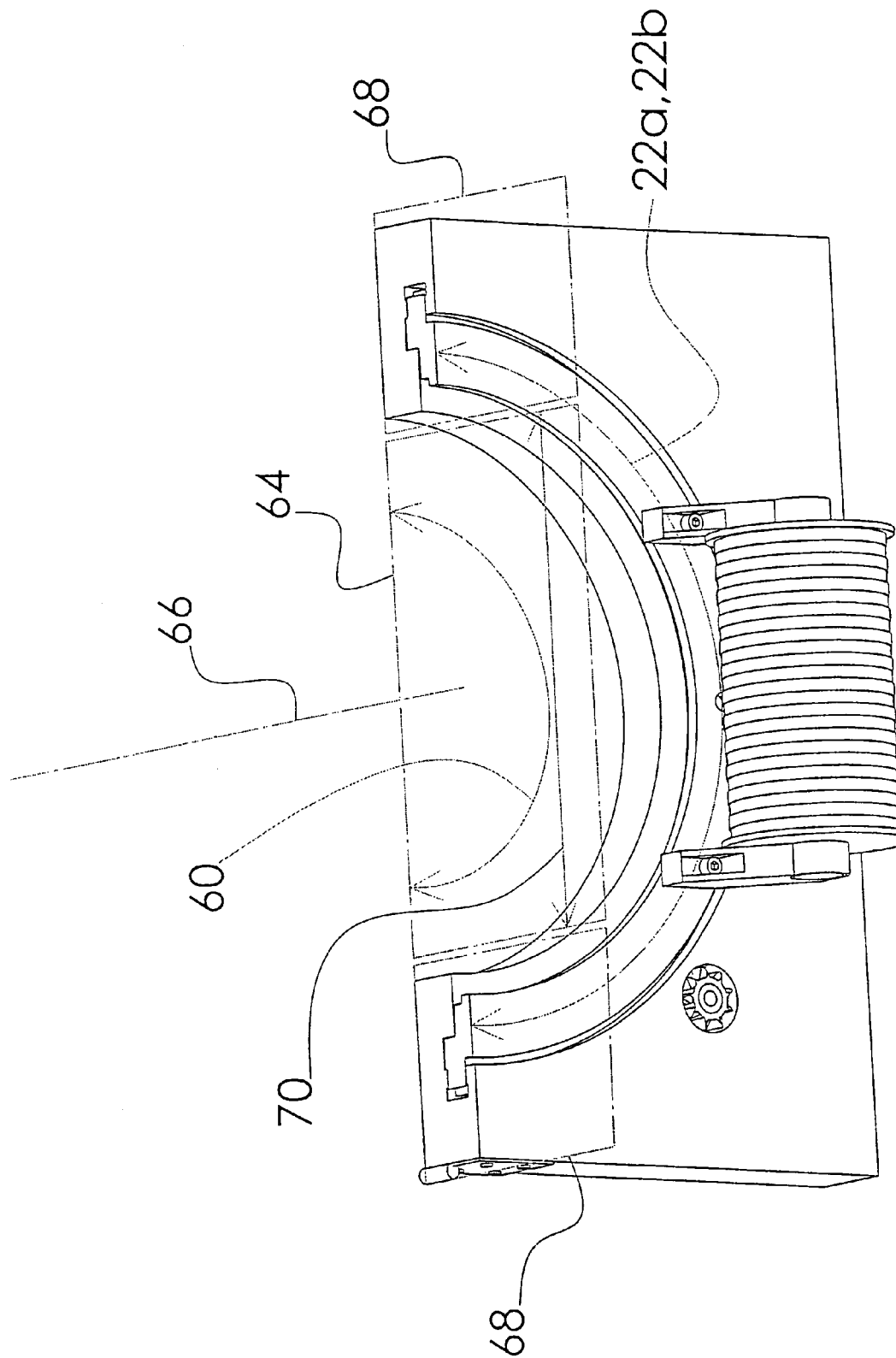
FIGS. 6A and 6B is a perspective view of sections of the race and carrier, in accordance with an embodiment of the present invention.

Referring to the embodiment of FIG. 6A, the sections 22a, 22b of the carrier 14 have an angular size 60 such that the combined sections 22a, 22b form a 360 degree arc. The sections 22a, 22b may have angular sizes that are equal or unequal. In the illustrated embodiment each section 22a, 22b has an equal angular size of 180 degrees. In some embodiments, the sections 24a, 24b forming the race 12 each have an angular size corresponding to a section 22a, 22b. Thus, if the sections 22a, 22b have angular sizes 60 of 270 degrees and 90 degrees, respectively, then sections 24a, 24b also have angular sizes approximating 270 degrees and 90 degrees, respectively.

Figure 6B:
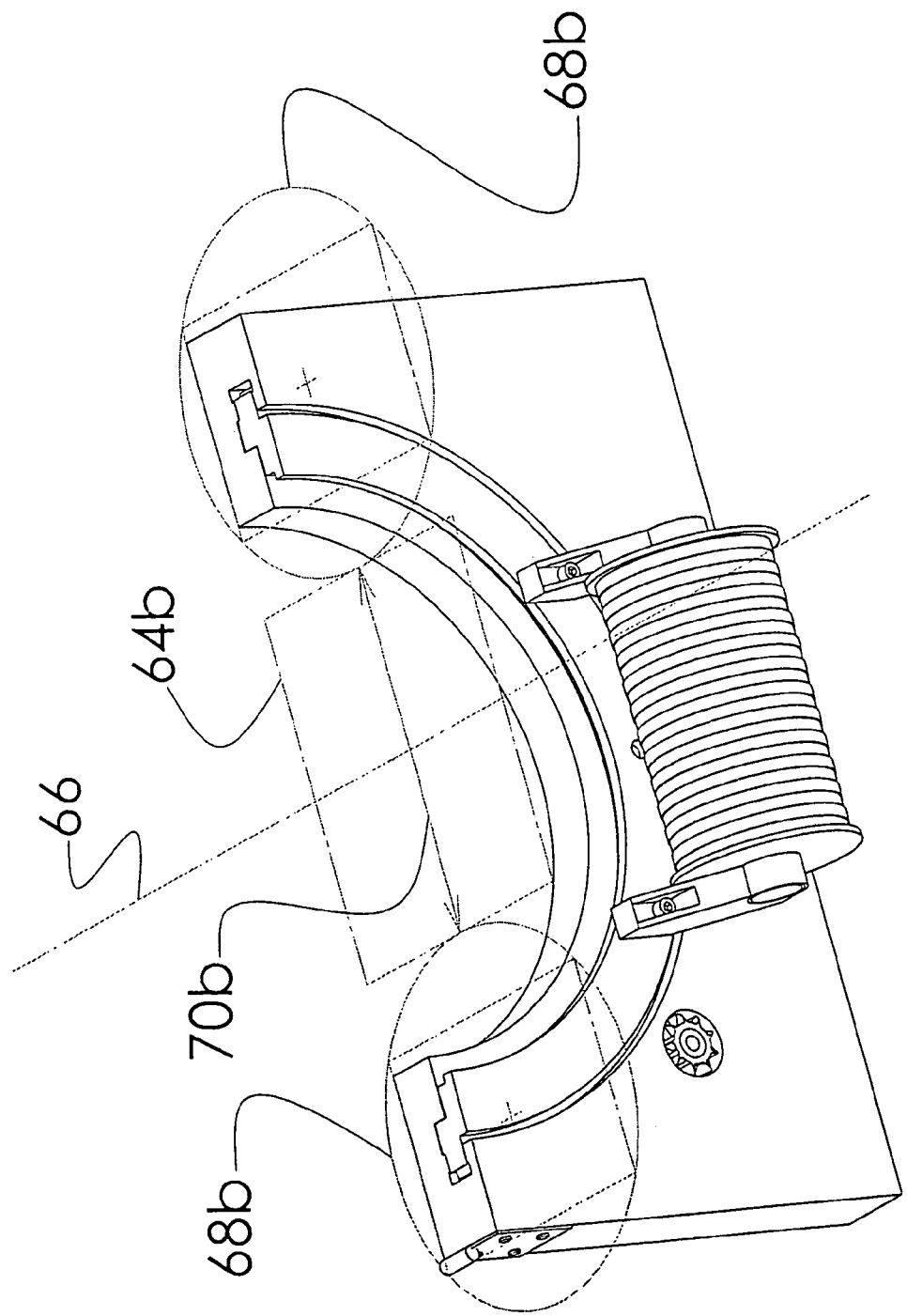
Figure 7A:
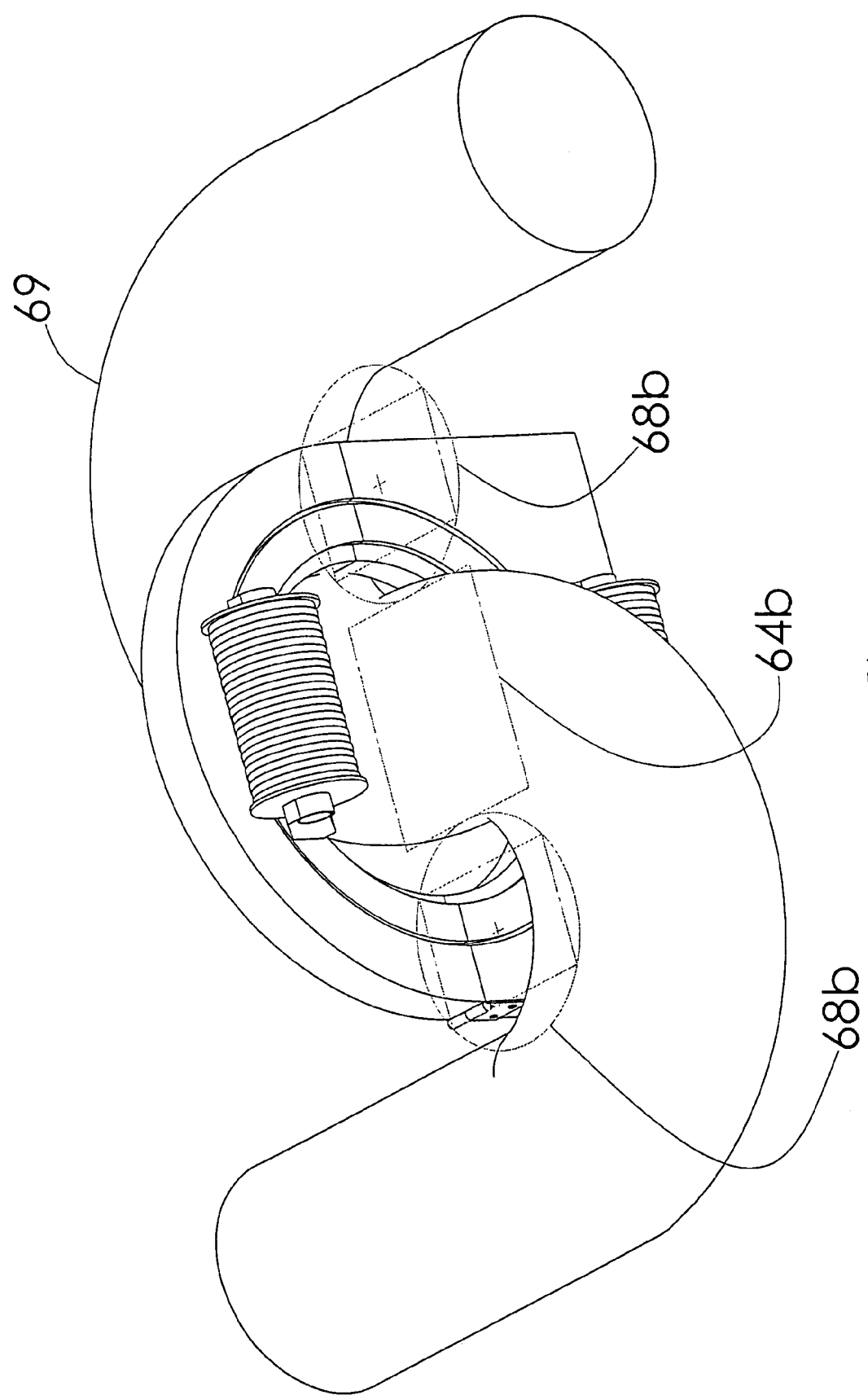
FIGS. 7A-7E are top plan views of shapes suitable for winding by a centerless race and tool carrier, in accordance with an embodiment of the present invention.
Figure 7B:
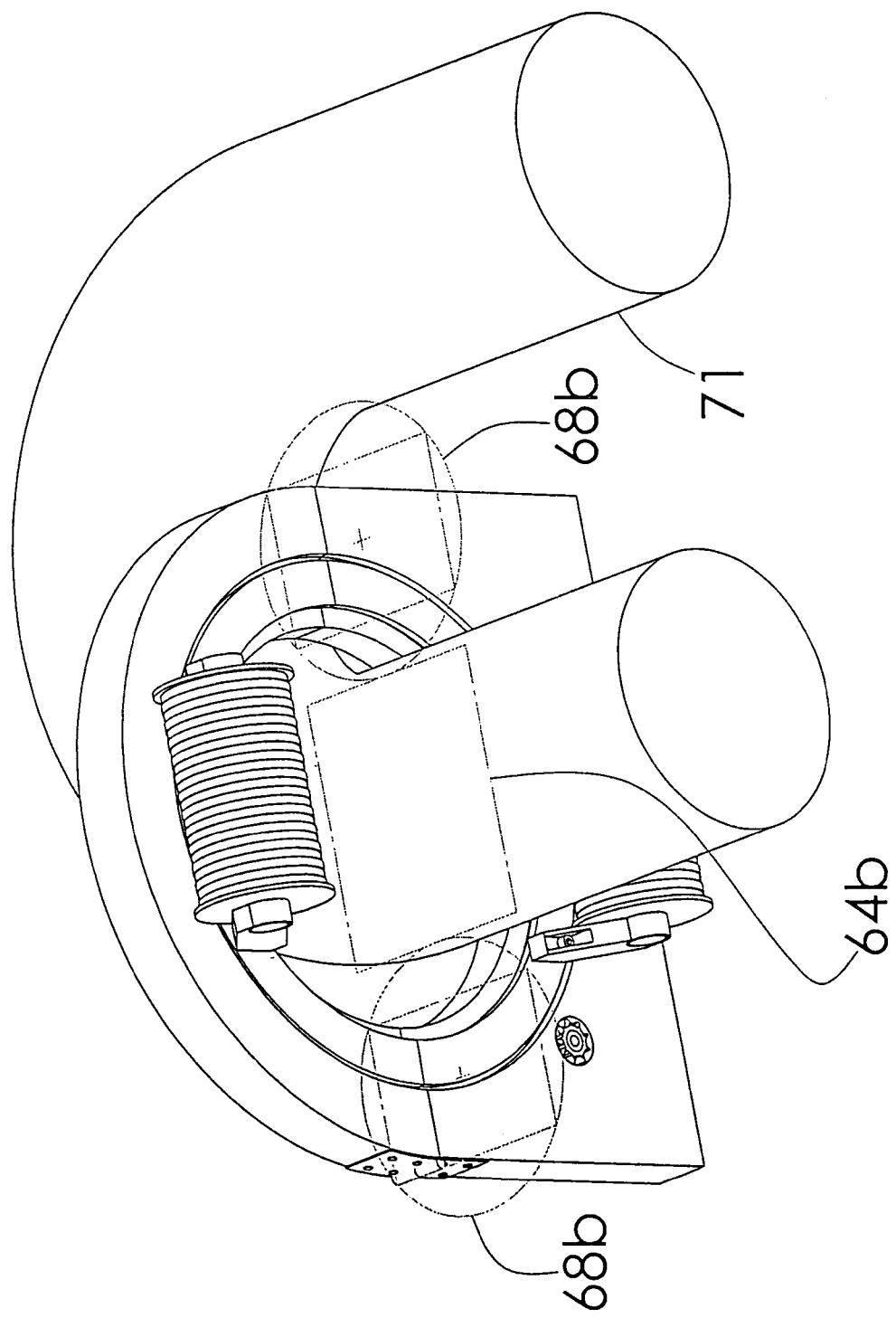
Figure 7C:
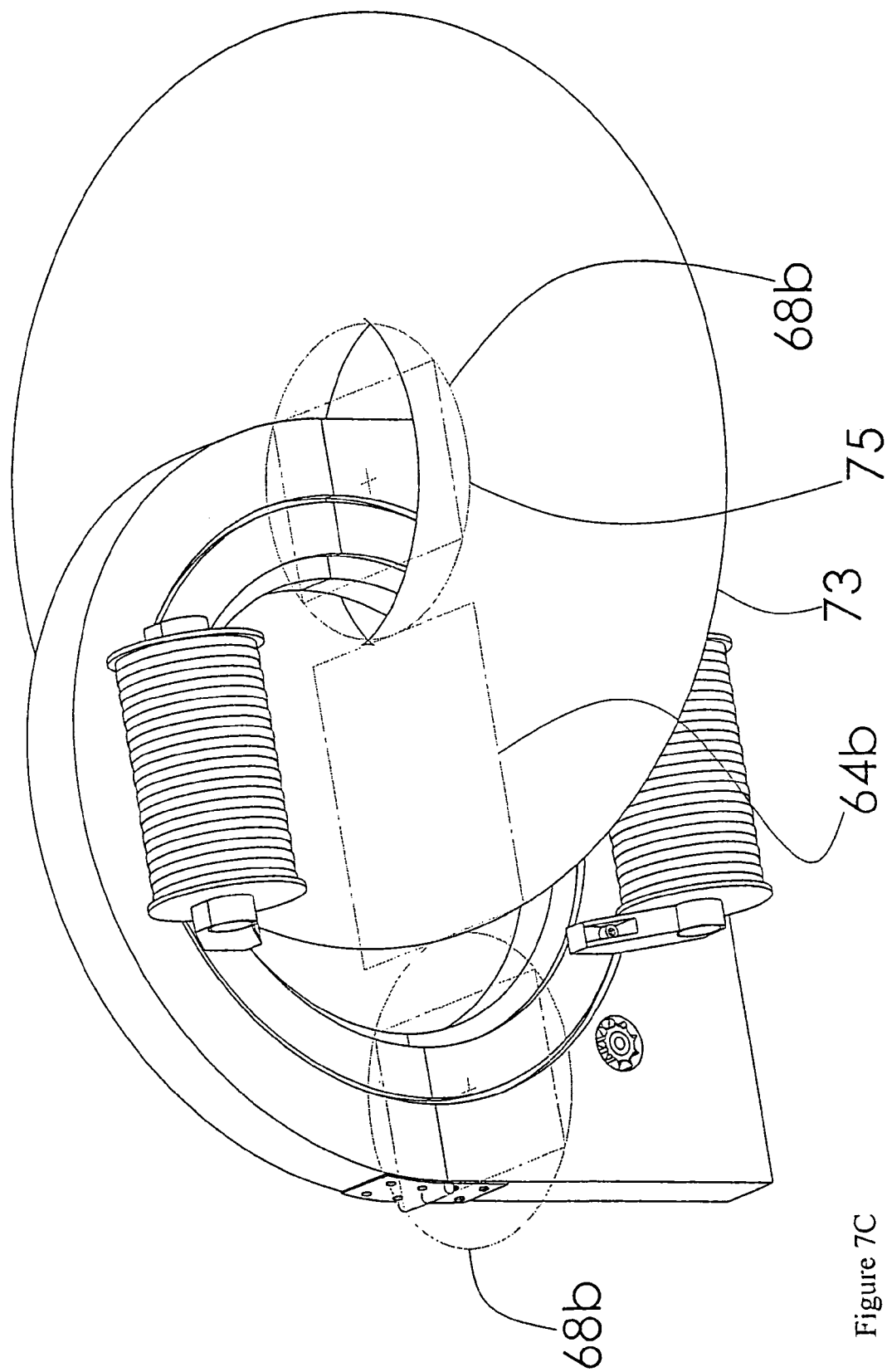
Figure 7D:
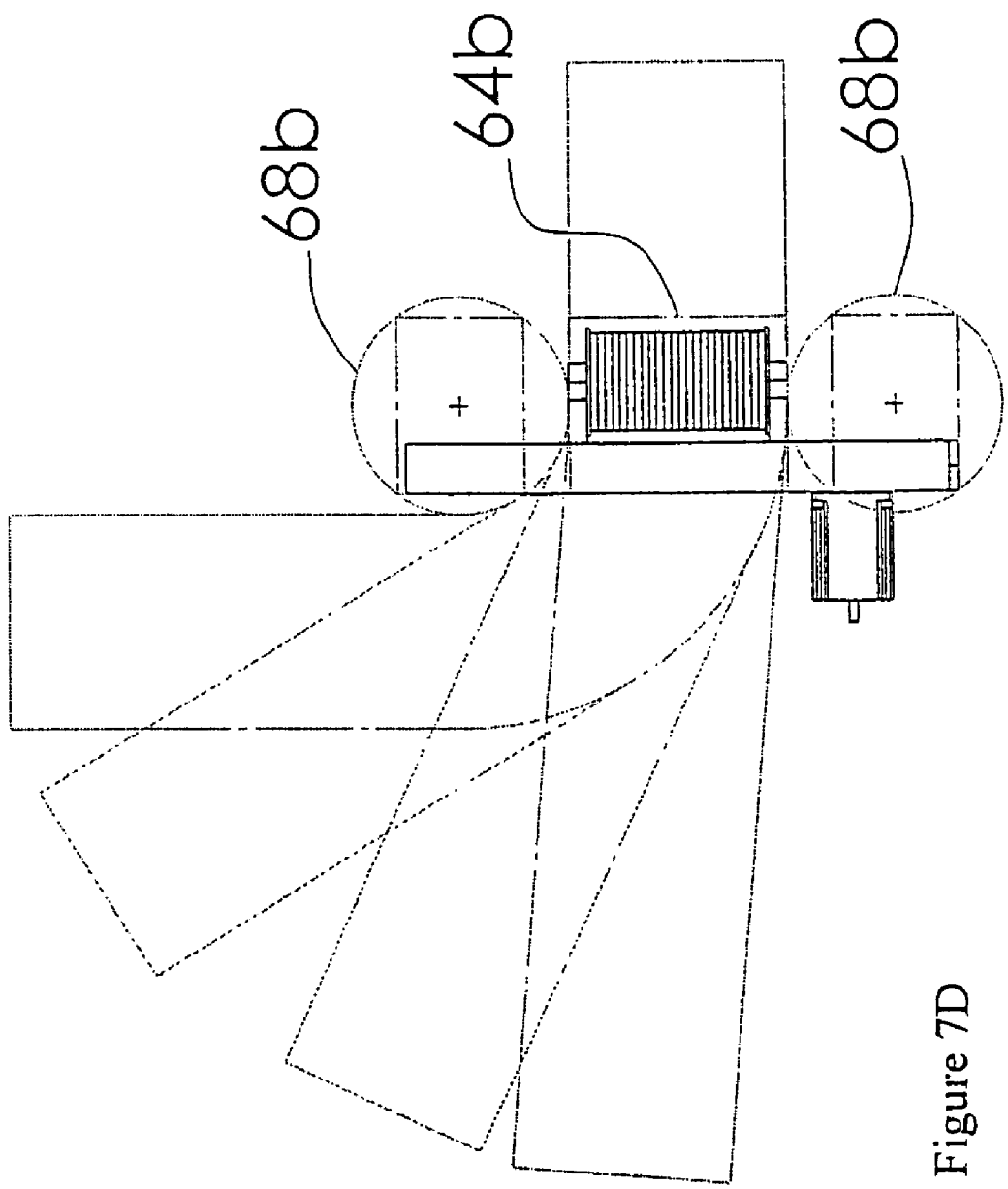
Figure 7E:
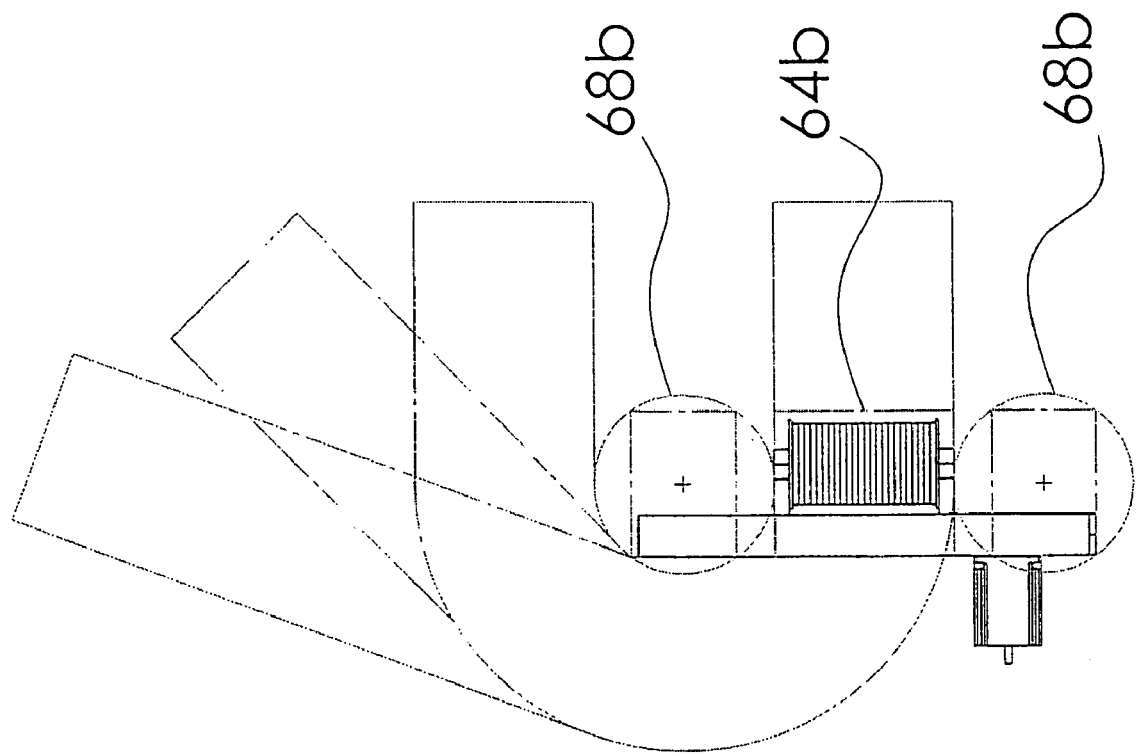

In this embodiment, sections 22a, 22b when combined form a working envelope, which is defined as the volume formed by revolving a rectangle 64 about an axis of symmetry 66 of the race 12. The rectangle 64 has a length approximately equal to the inside diameter of the race 12 and a width approximately equal to the width of the combined race 12, carrier 14, and spools 18. The envelope may be further defined by areas 68 representing the space occupied by the shroud 30 or through which the spindles 20 pass during operation. Referring to FIG. 6B, the work envelope 64b is defined by distance 70b between circles 68b which are circumscribed around the rectangles 68. The work envelope 64b is particularly useful when dealing with non-linear workpieces. As an example, the S-shaped structure 69 of FIG. 7A occupies a substantial portion of the area 64b and abuts the areas 68b. In a similar manner, the U-shaped structure 71 of FIG. 7B may be operated on by the apparatus 10 inasmuch as the area 68b is smaller than the area between the legs of the U-shaped structure 71 and the thickness of the structure 71 is smaller than the rectangle 64b. A closed shape, such as O-shaped structure 73 of FIG. 7C may likewise be operated on by the apparatus 10 inasmuch as an open area within the structure 75 is at least as large as the area 68b and the thickness of the structure is smaller than the rectangle 64. In some embodiments, the separability of the sections 22a, 22b of the carrier 14 and the sections 24a, 24b of the race 12 enables closed loops, such as the O-shaped structure 73 of FIG. 7C to be wound by the apparatus 10. Structures having obtuse angles as in FIG. 7D and acute angles 7E may likewise be wound using the apparatus 10.

Windings substantially tangent to the interior edge of the O-shaped structure 73 may be achieved by coordinating the feed rate of the structure through the carrier 14 and the rotation speed of the carrier 14. In a like manner, some embodiments of the present invention achieve windings with angles relative to the structures illustrated in FIGS. 7A-7E.

In some embodiments, the angular size 60 of the sections 22a, 22b determines an insertion size of the apparatus 10. For example, where the sections 22a, 22b have angular sizes 60 of 180 degrees, the insertion size is the inside diameter 70 of the carrier 14. Whereas in other embodiments, as shown in FIG. 8, for angular sizes 60 of more than 180 degrees, the insertion size may be reduced to the distance 72 between the ends of the sections 22a, 22b having the larger angular size.

Figure 8:
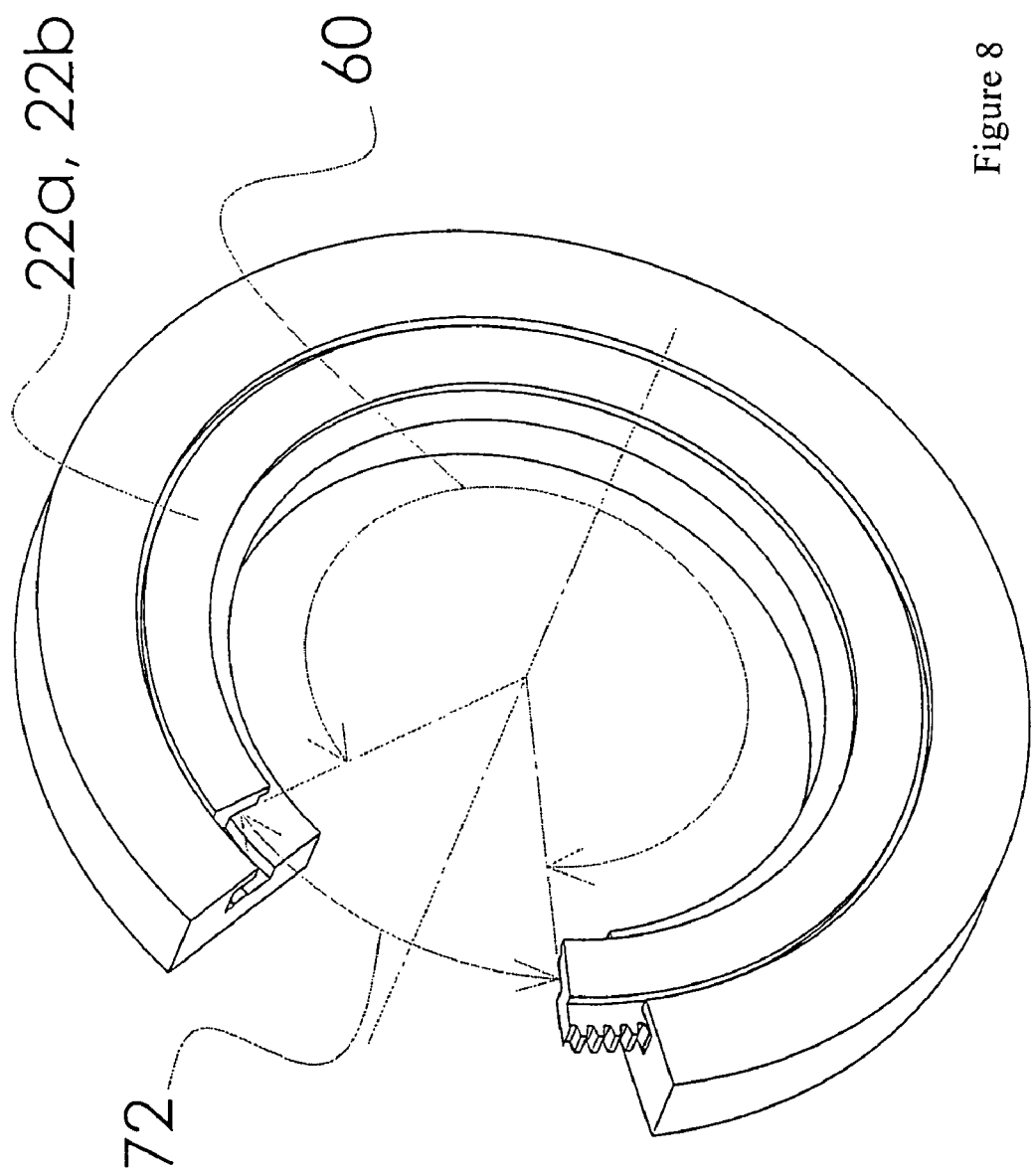
FIG. 8 is a perspective view of an alternative embodiment of a race and carrier, in accordance with an embodiment of the present invention.

Also the apparatus as seen in FIG. 8 may function as shown without an additional race 12 or carrier 14 segment, so long as the carrier 14 can cross the gap in the race 12 and continue to rotate (this setup would require a belt drive or multiple motors, to compensate for the gap in the shuttle).

Figure 9:
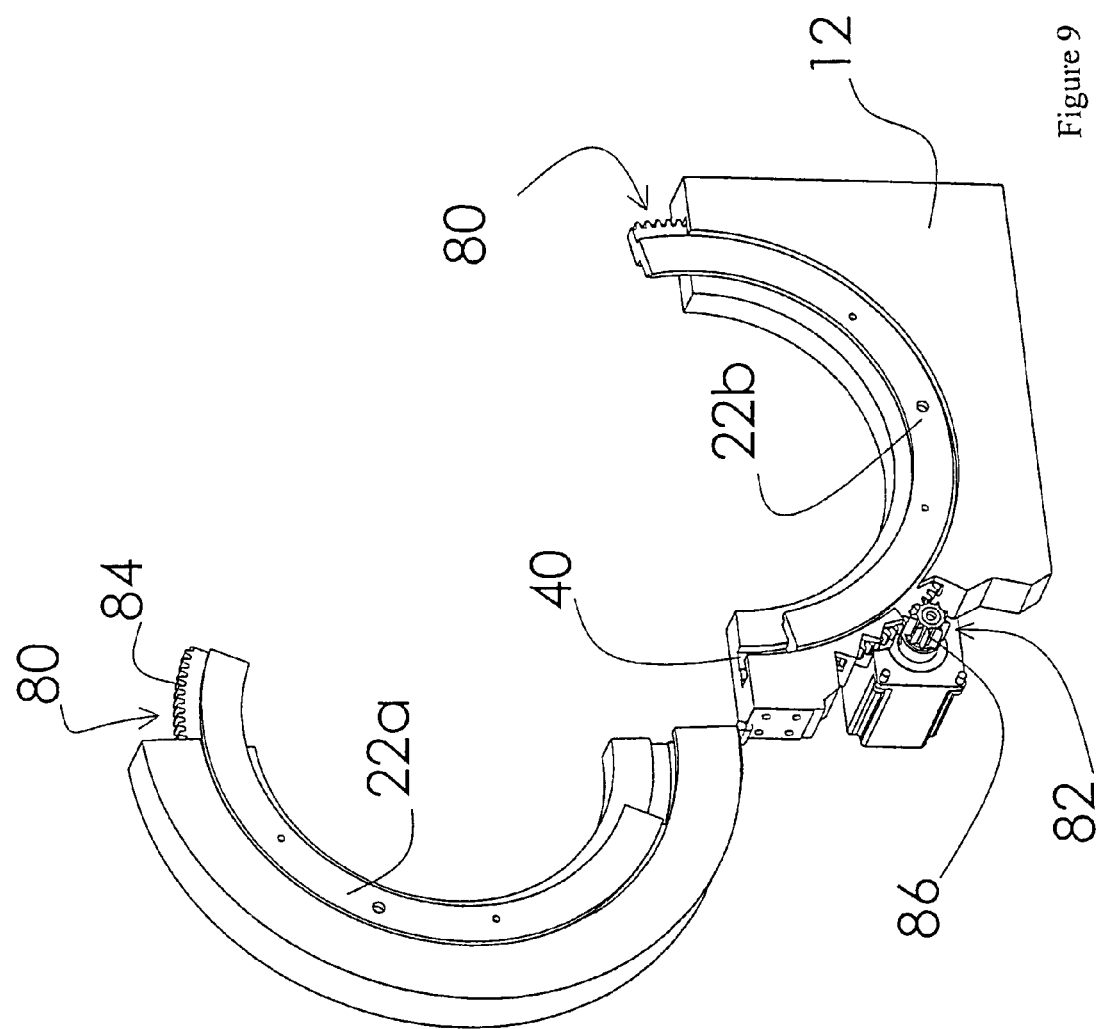
FIG. 9 is a perspective view illustrating driving surfaces of a carrier, in accordance with an embodiment of the present invention.
Figure 10:
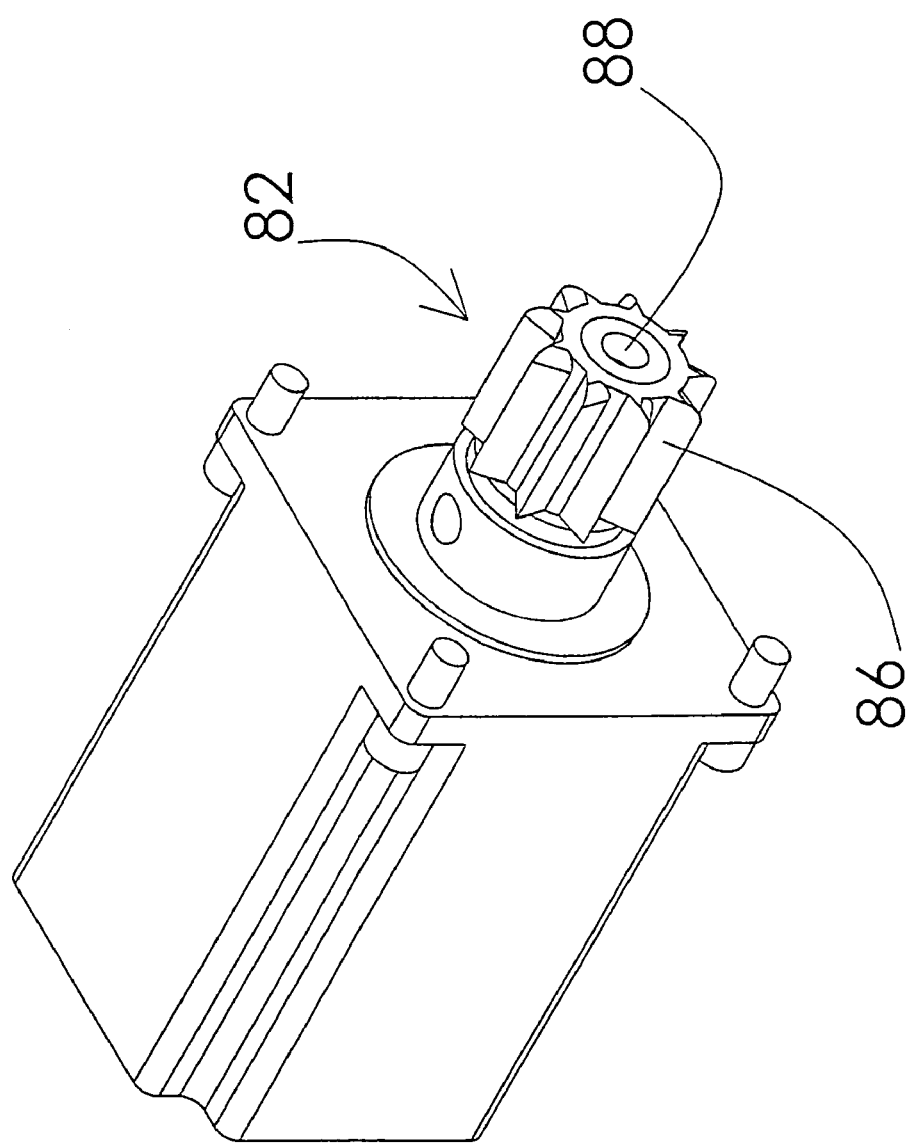
FIG. 10 is a perspective view of a drive gear and motor, in accordance with an embodiment of the present invention.

Referring to the embodiments shown in FIGS. 9 and 10, the sections 22a, 22b may have a driving surface 80 secured thereto. The driving surface 80 may engage a driver 82, which is powered by an electric motor (not shown), or like means for supplying rotational force. In the illustrated embodiment, the driving surface 80 is a series of gear profiles 84 which engage a driver 82 embodied as a gear 86. The gear 86 is mounted on a shaft 88 that extends at least partially through the race 12, such that the gear 86 is positioned with the teeth thereof within the guide 40 in engagement with the gear profiles 84. In some embodiments, the shaft 88 extends outwardly from the race 12 in order to engage a source of rotational force, such as an electric motor (not shown).

Various embodiments of driver 82 and driving surface 80 are possible. For example, the driving surface 80 may be embodied as a high friction surface, such as a rubber layer or textured surface, which engages the driver 82 embodied as a roller, which may likewise have a high friction surface. In embodiments of the invention having a single section 22a, 22b multiple drivers 82 or drivers 82 engaging a substantial angular portion of the driving surface 80 may be used, inasmuch as the rotational movement of the carrier 14 will periodically position a gap over the driver 82.

Figure 11A:
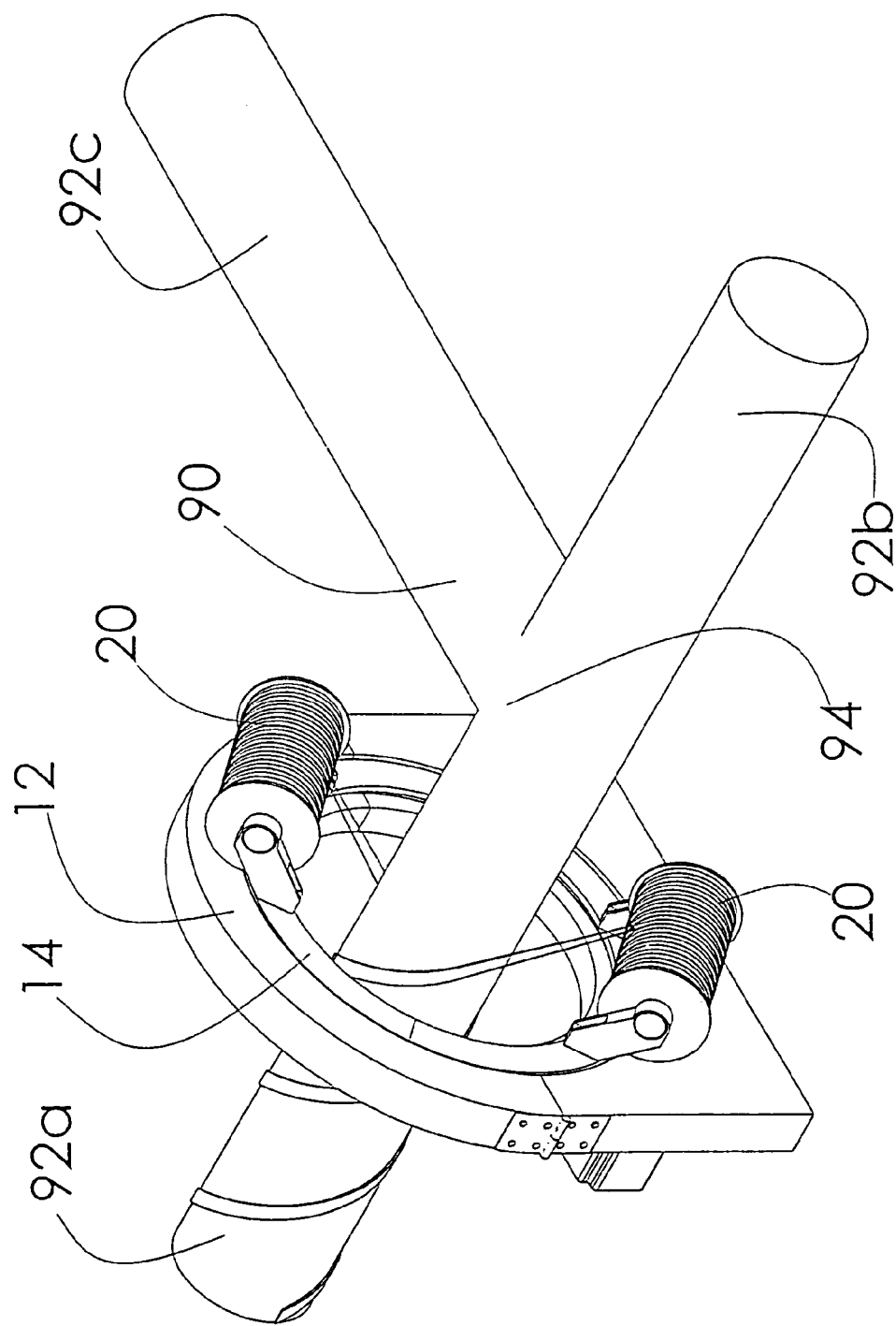
FIGS. 11A-11C are perspective views of a process for winding a branched structure, in accordance with an embodiment of the present invention.
Figure 11B:
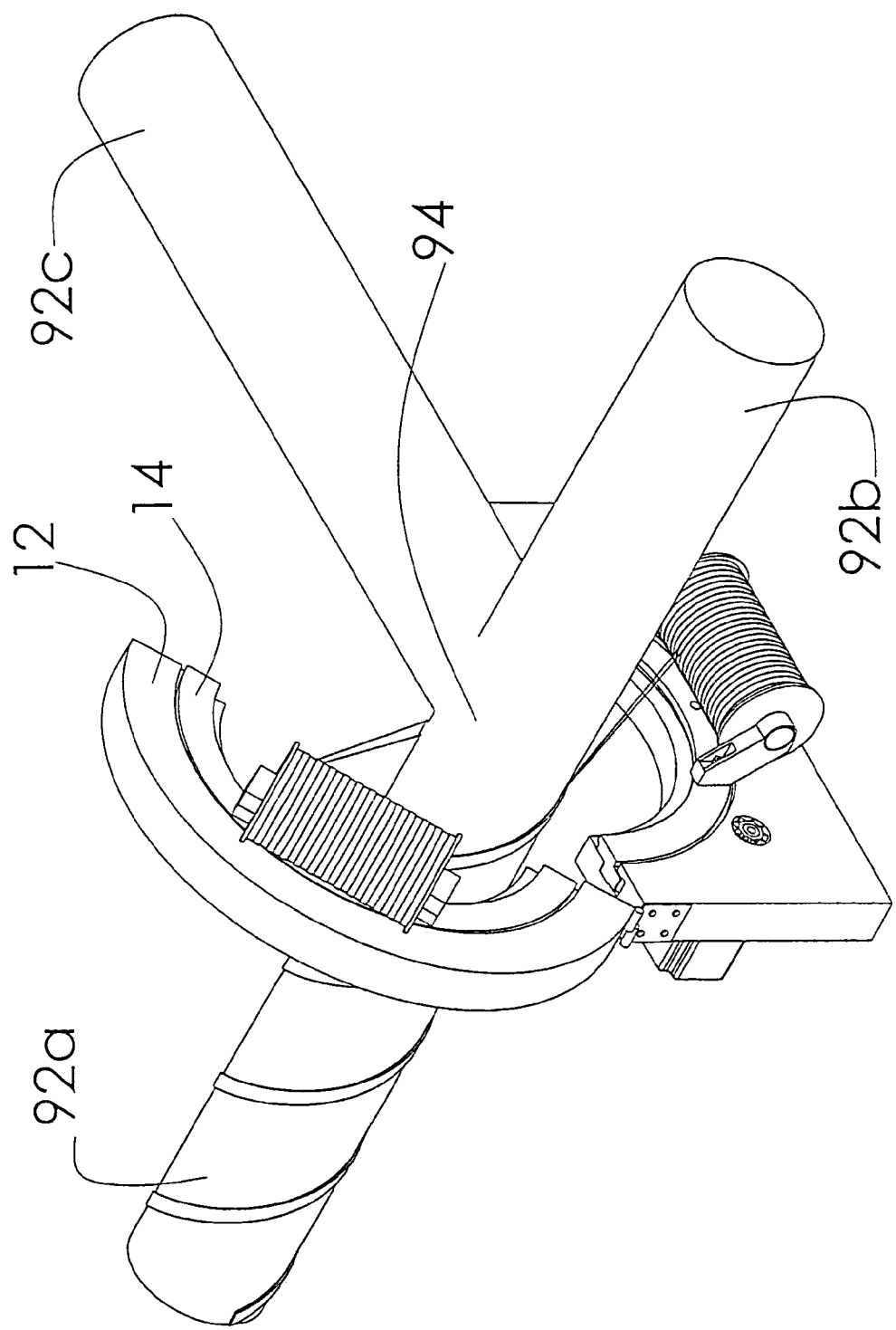
Figure 11C:
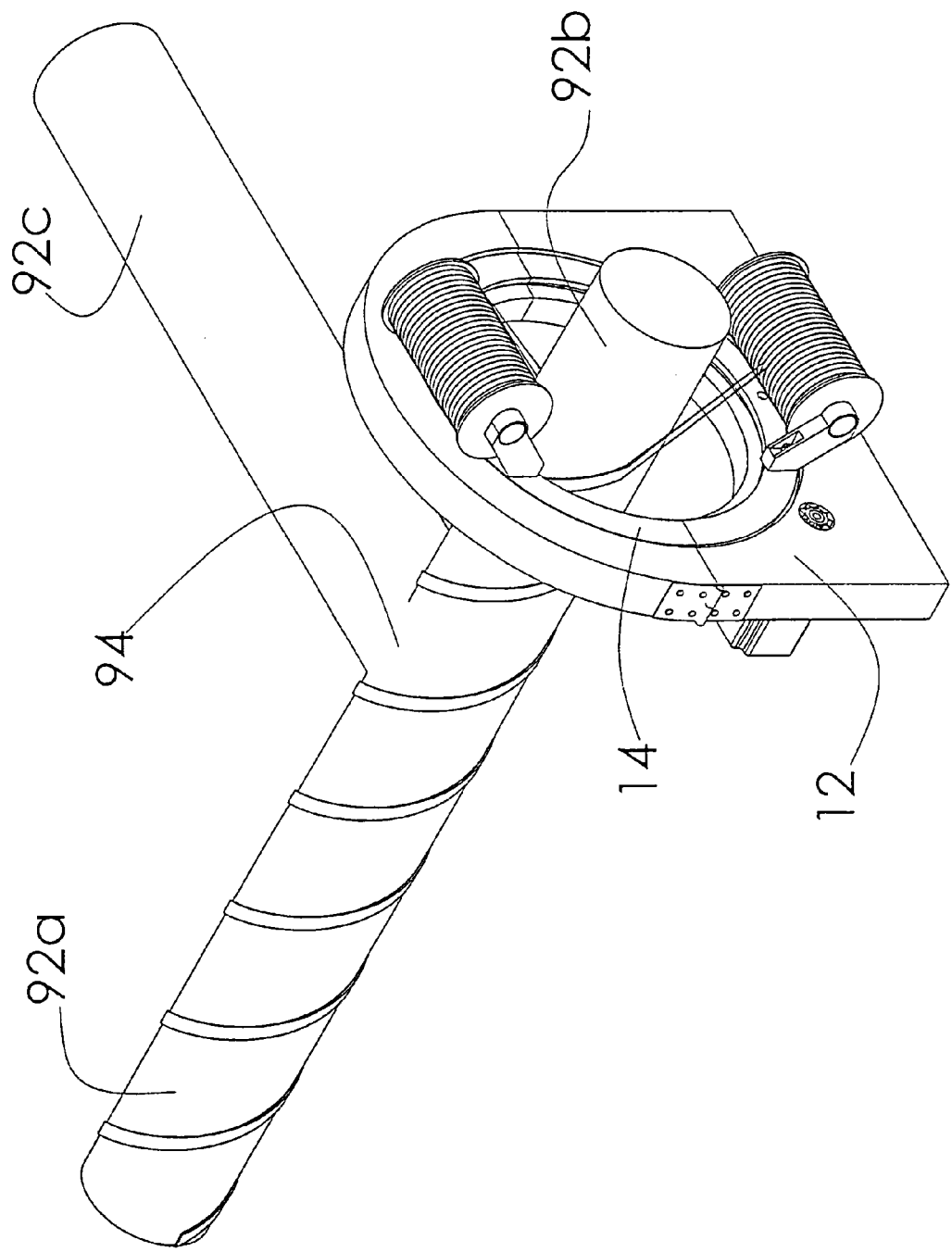

FIGS. 11A-11C show examples of a method of operating the apparatus 10. In one embodiment, a T-shaped mandrel 90 having branches 92a-92c joining at a yoke 94 are wound with a filament discussed hereinabove. A first branch 92a may pass through the race 12 and carrier 14 as the carrier 14 and spindle 20 revolve thereabout depositing windings of filament thereon. After the branch 92a passes through to the yoke 94, the sections 22a, 22b of the carrier 14 and the sections 24a, 24b of the race 12 are separated, such as by a hinged motion, permitting the branch 92*b* to pass therethrough, as shown in FIG. 11B. The sections 22*a,* 22*b* of the carrier 14 and the sections 24*a,* 24*b* of the race 12 may then be rejoined surrounding the branch 92*c* as shown in FIG. 11*b.* The sections 22*a,* 22*b* of the carrier 14 and the sections 24*a,* 24*b* of the race 12 may again be opened to position the carrier 14 and race 12 around the branch 92*b.* The steps illustrated in FIGS. 11A-11C may be executed in various orders and numbers of iterations to achieve a deposited layer of filament sufficiently strong for an intended application.

Figure 12:
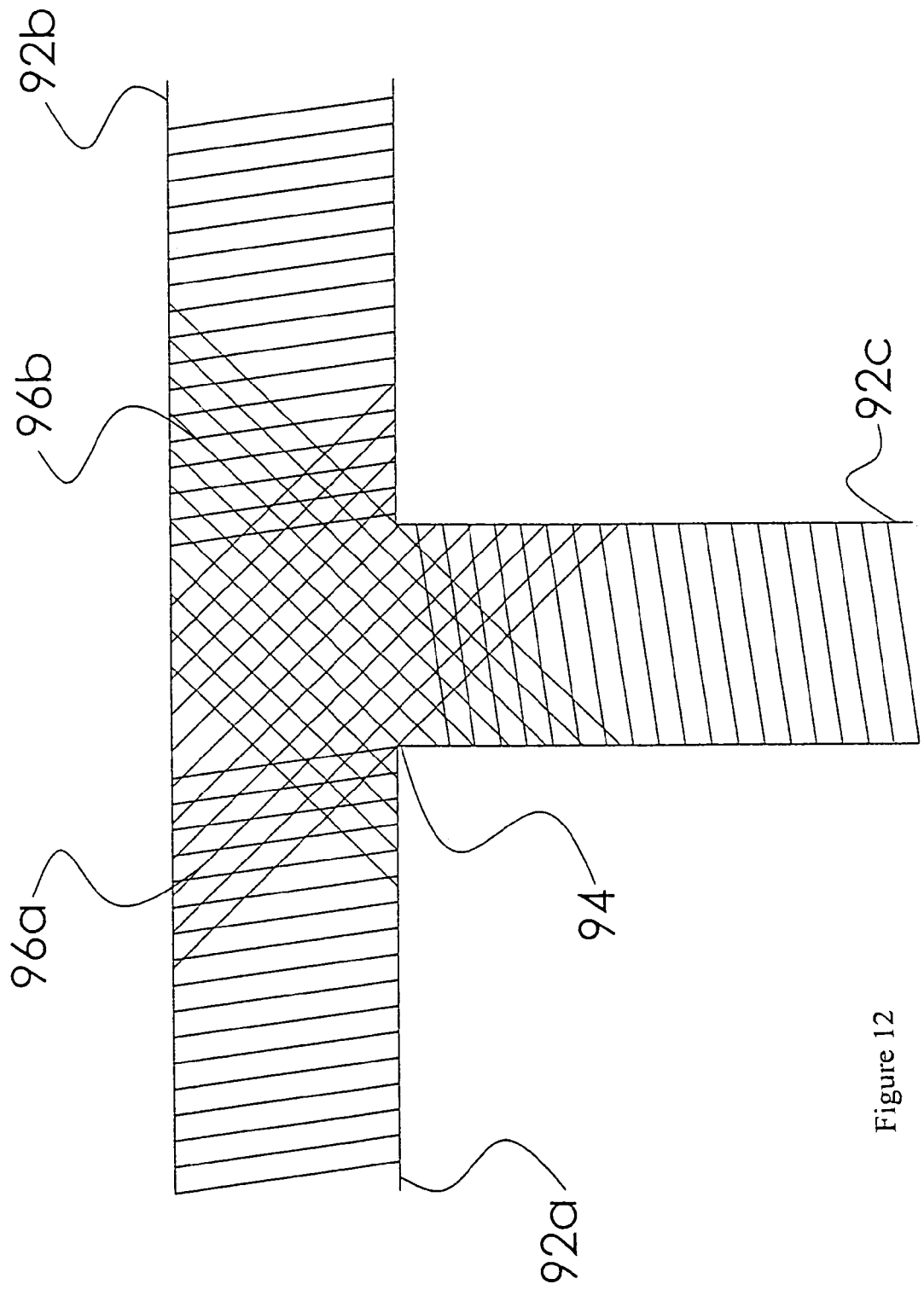
FIG. 12 is a top view of a winding pattern for the yoke of a branched structure, in accordance with an embodiment of the present invention.
Figure 13:
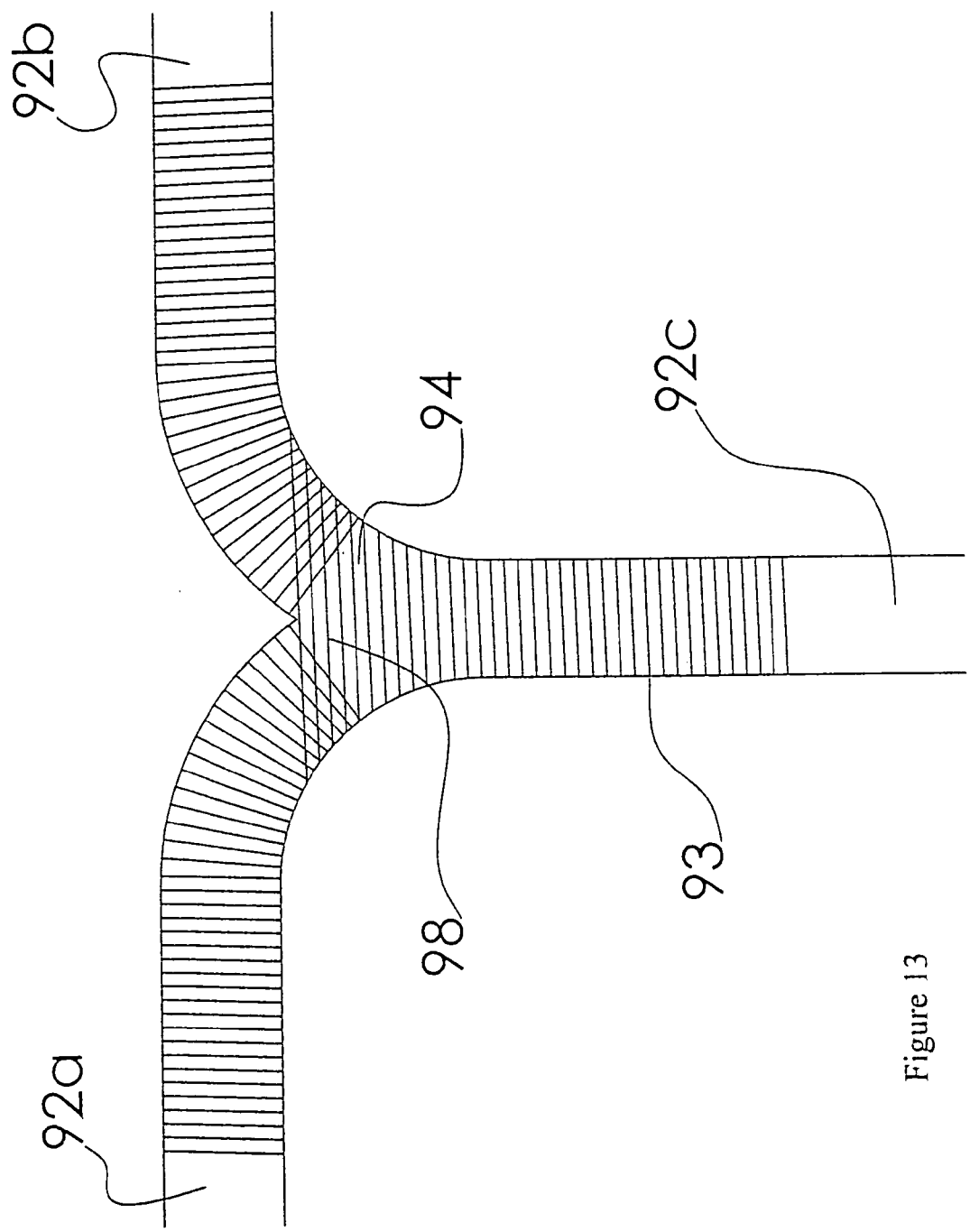
FIG. 13 is a top view of a winding pattern for the yoke of an alternative embodiment of a branched structure, in accordance with an embodiment of the present invention.
Figure 14A:
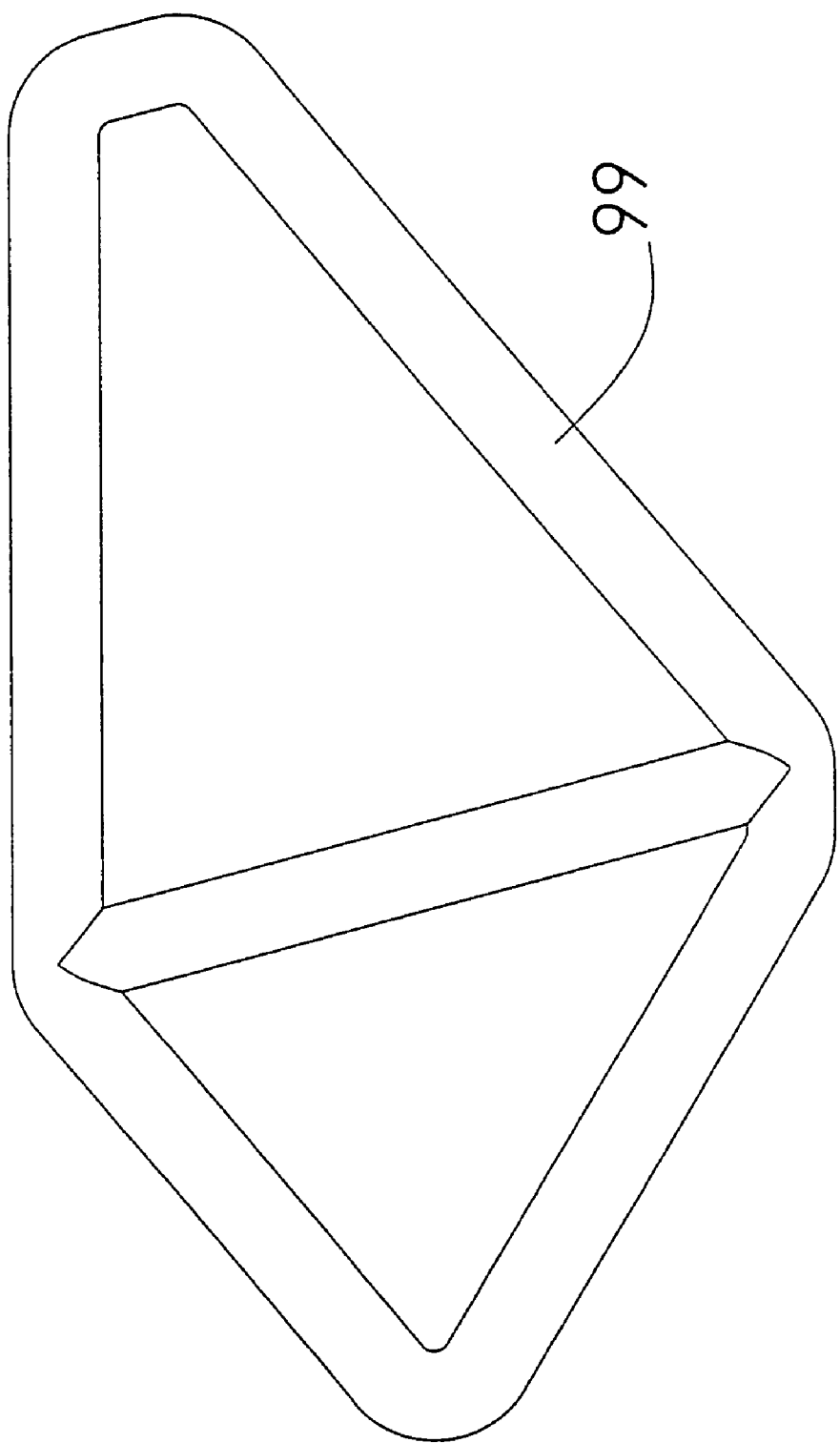
FIGS. 14A and 14B are top and perspective views of structures suitable for manufacture using the centerless race and tool carrier, in accordance with an embodiment of the present invention.
Figure 14B:
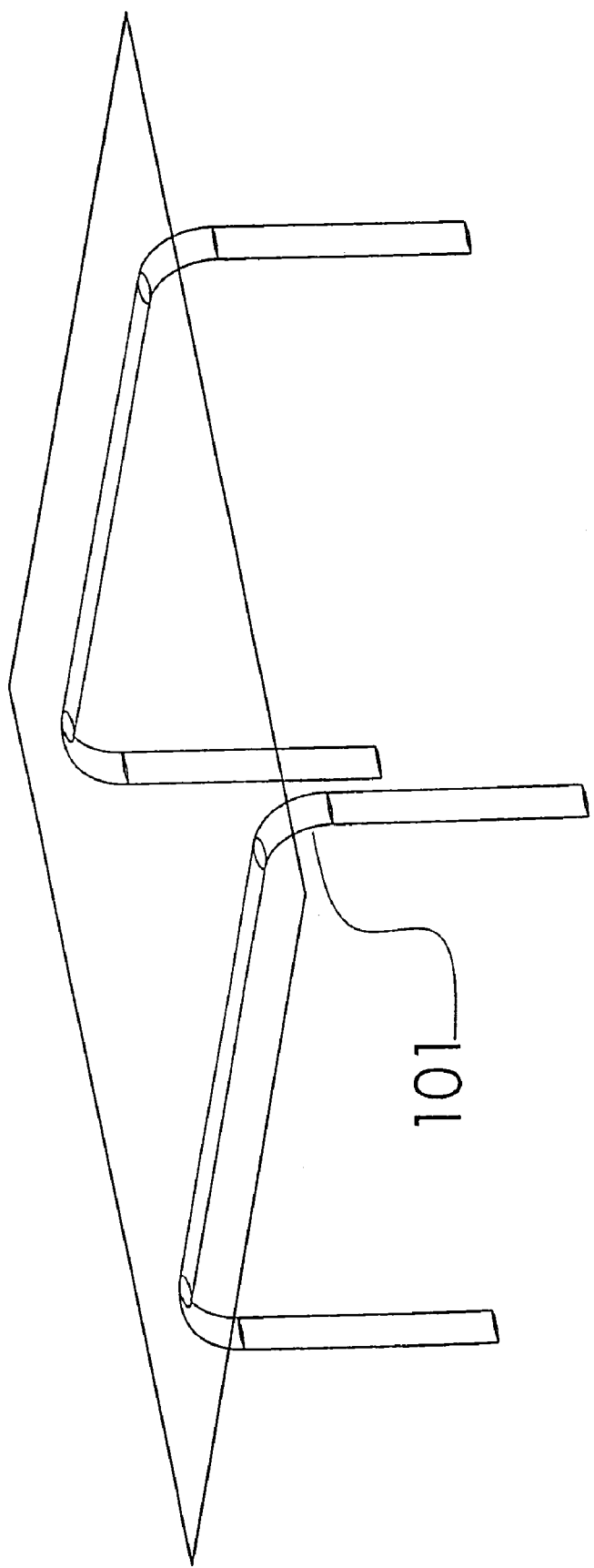

Referring to FIG. 12, in one embodiment, the yoke 94 may be wound in the pattern illustrated. The yoke 94 may be passed through the carrier 14 and race 12 to deposit windings 96*a.* The sections 22*a,* 22*b* of the carrier 14 and the sections 24*a,* 24*b* of the race 12 may then be opened and the yoke 94 repositioned to deposit windings 96*b* at the opposite side of the yoke 94. The steps illustrated in FIGS. 11A-11C and FIG. 12 may be executed in various orders and numbers of iterations to achieve a deposited layer of filament sufficiently strong for an intended application.

Branched shapes other than the T-shaped structures 90 as shown in FIGS. 11A-11C and 12 may be advantageously manufactured. For example, the Y-shaped structure 93 of FIG. 13 may provide yoke 94 which is readily wound. Windings may be applied to branches 92*a*-92*c* as in FIGS. 11A-11C. However, the Y-shaped configuration of FIG. 13 enables a single winding 98 to be applied to the yoke 94.

Mandrels including combinations of curved, closed, and branched structures may also be operated on in some embodiments by the apparatus 10 inasmuch as the spool 18 moves relative to the structure and high speed revolution of the structure is not required. Such combinations of shapes may include a bicycle frame 99 of FIG. 14A or a table's legs 101 of FIG. 14B.

Figure 15:
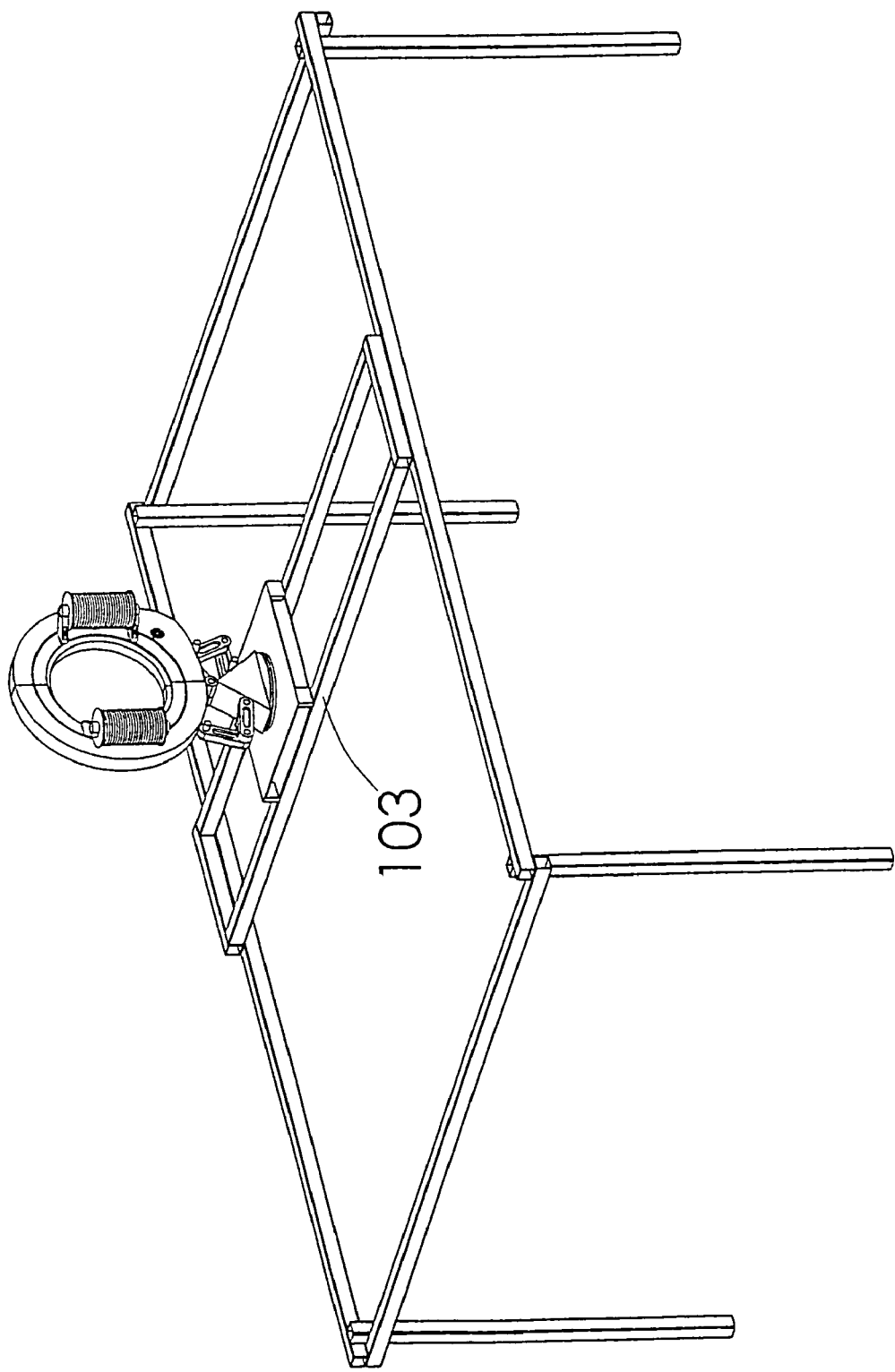
FIG. 15 is a perspective view of a centerless race and tool carrier mounted to a table actuator, in accordance with an embodiment of the present invention.

Referring to FIG. 15, in some embodiments, various aspects of the operation of the apparatus 10 may be automated to improve speed and consistency of use. For example, in some embodiments, the apparatus 10 is mounted to a table actuator 103 moving in an X-Y plane and providing for rotation of the apparatus 10 about a vertical axis orthogonal to the X-Y plane. This setup facilitates the processing of two-dimensional shapes like those found in FIGS. 7 and FIG. 11.

Figure 16A:
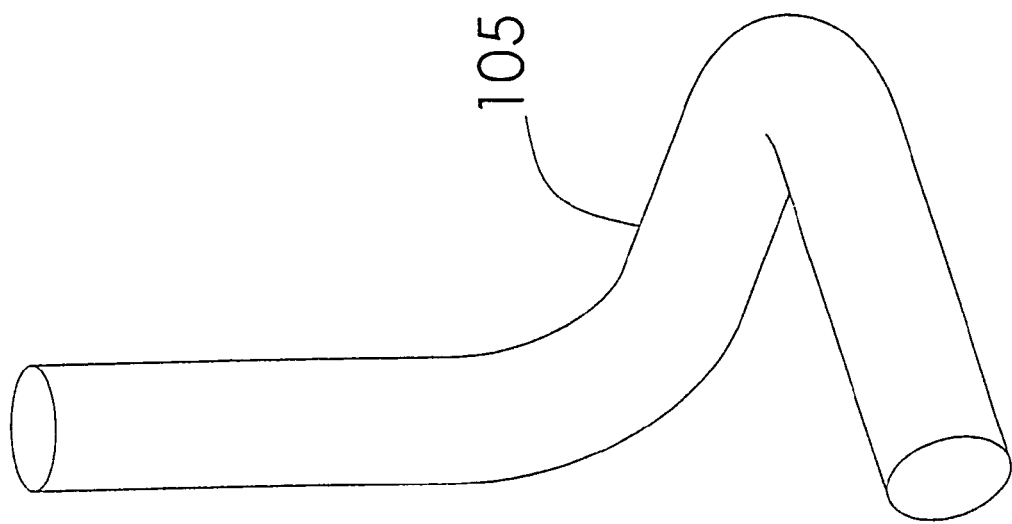
FIGS. 16A-16E are perspective views of 3D shapes that can be processed in accordance with an embodiment of the present invention.
Figure 16B:
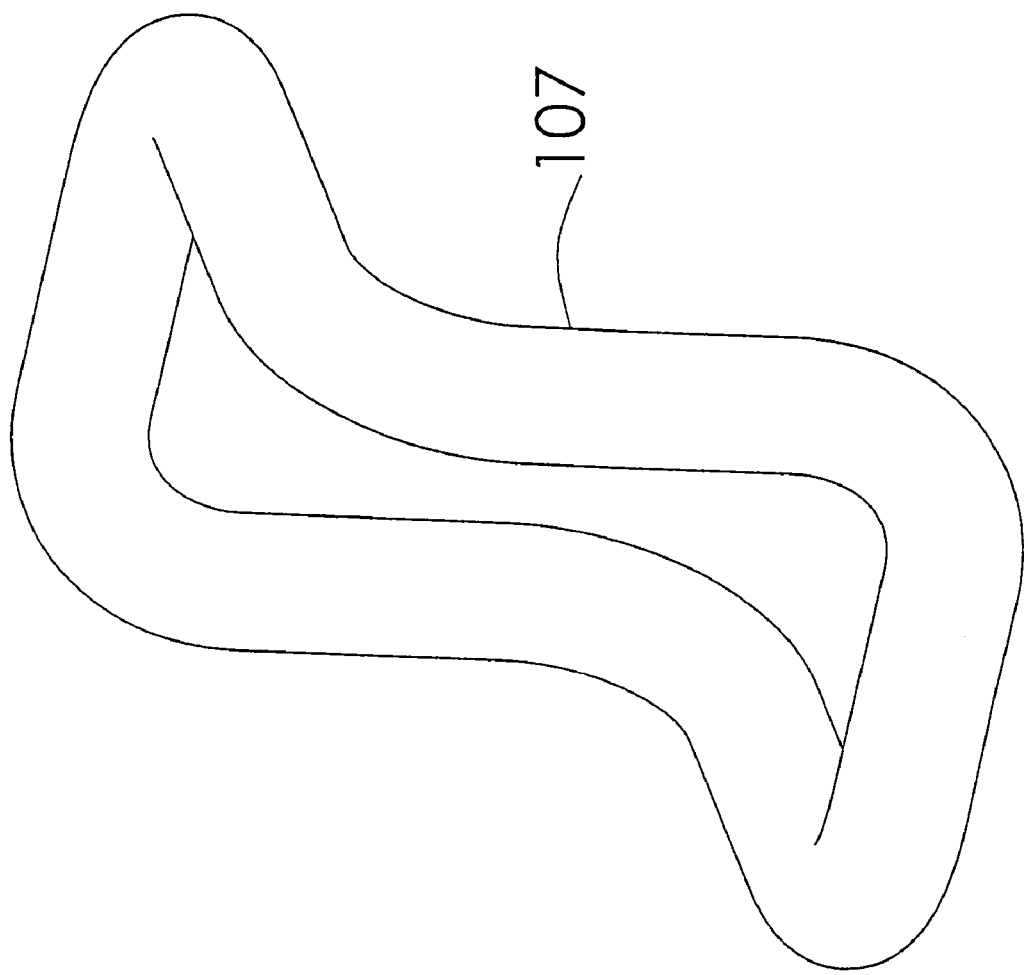
Figure 16C:
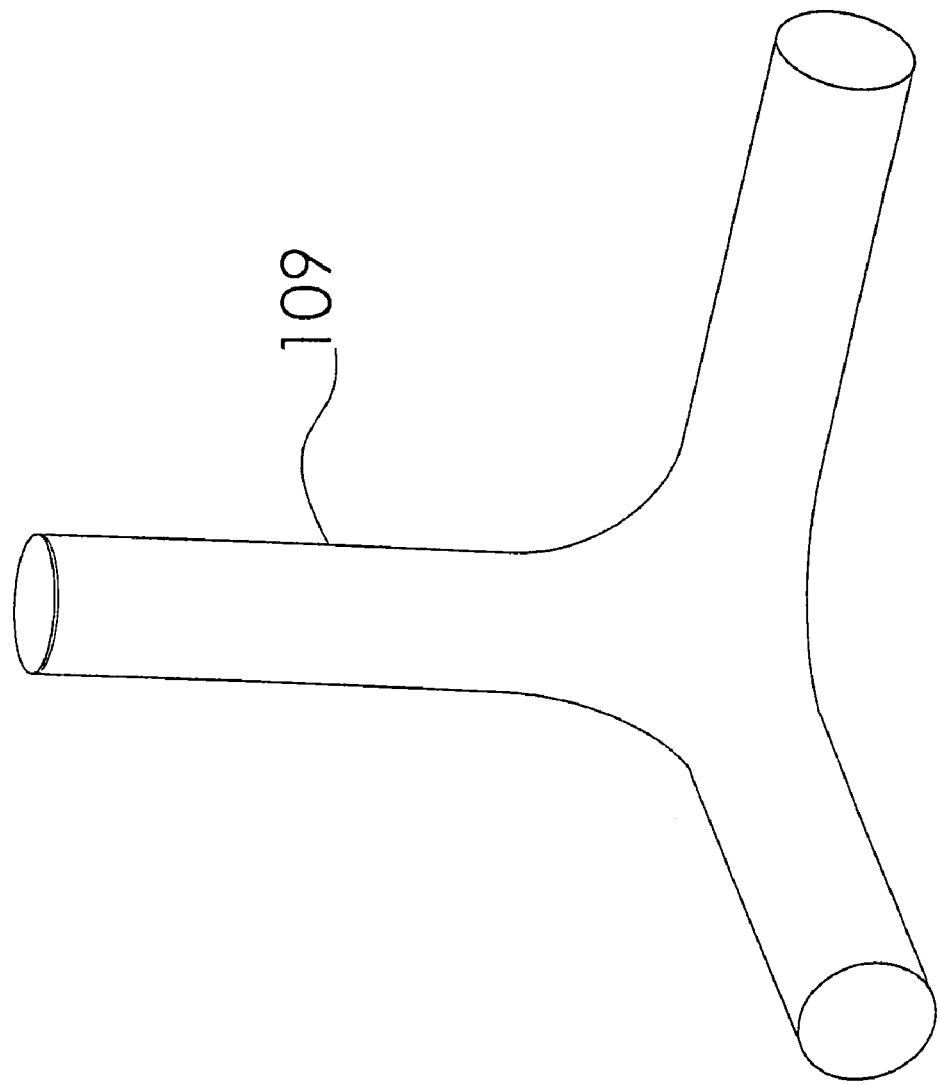
Figure 16D:
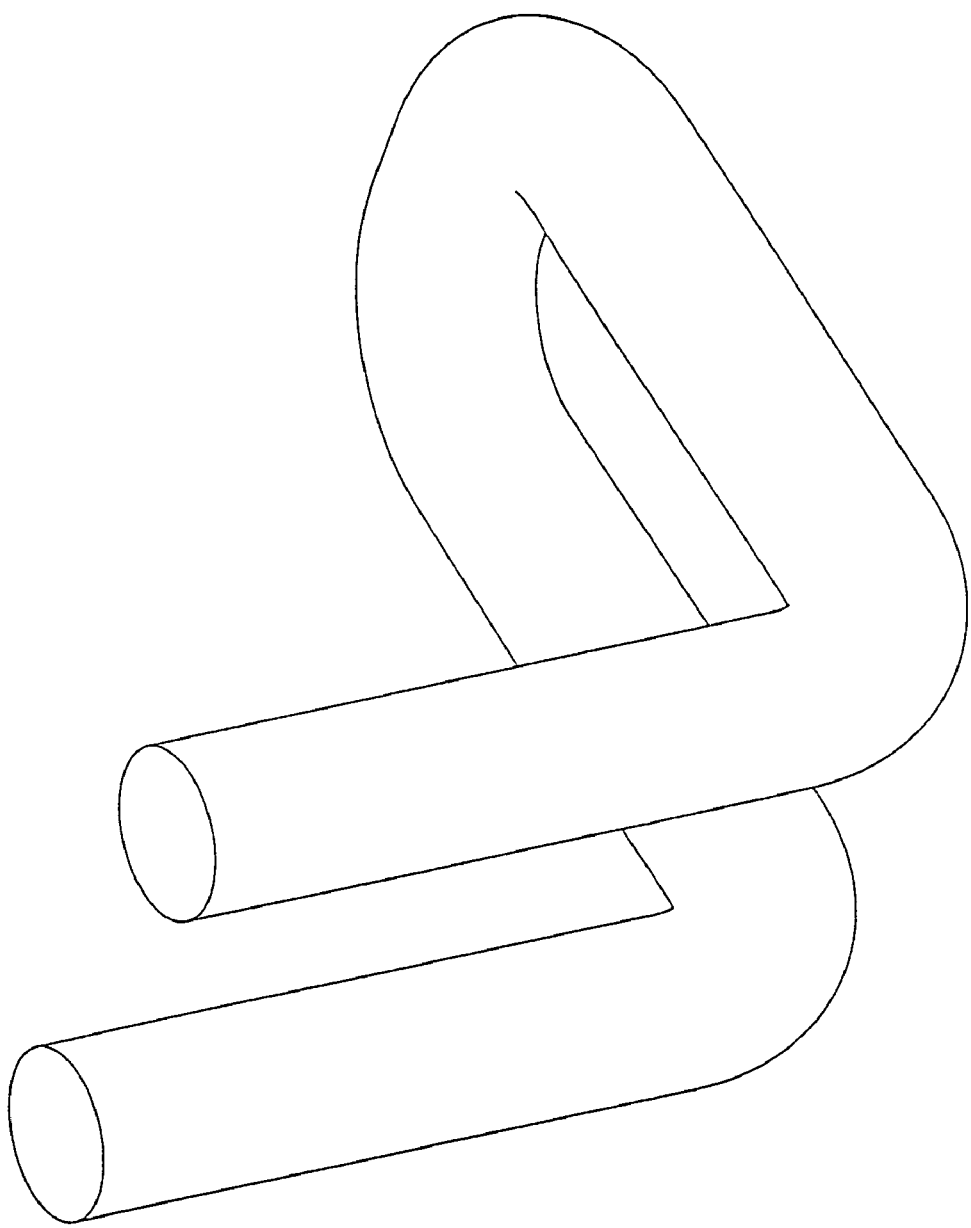
Figure 16E:
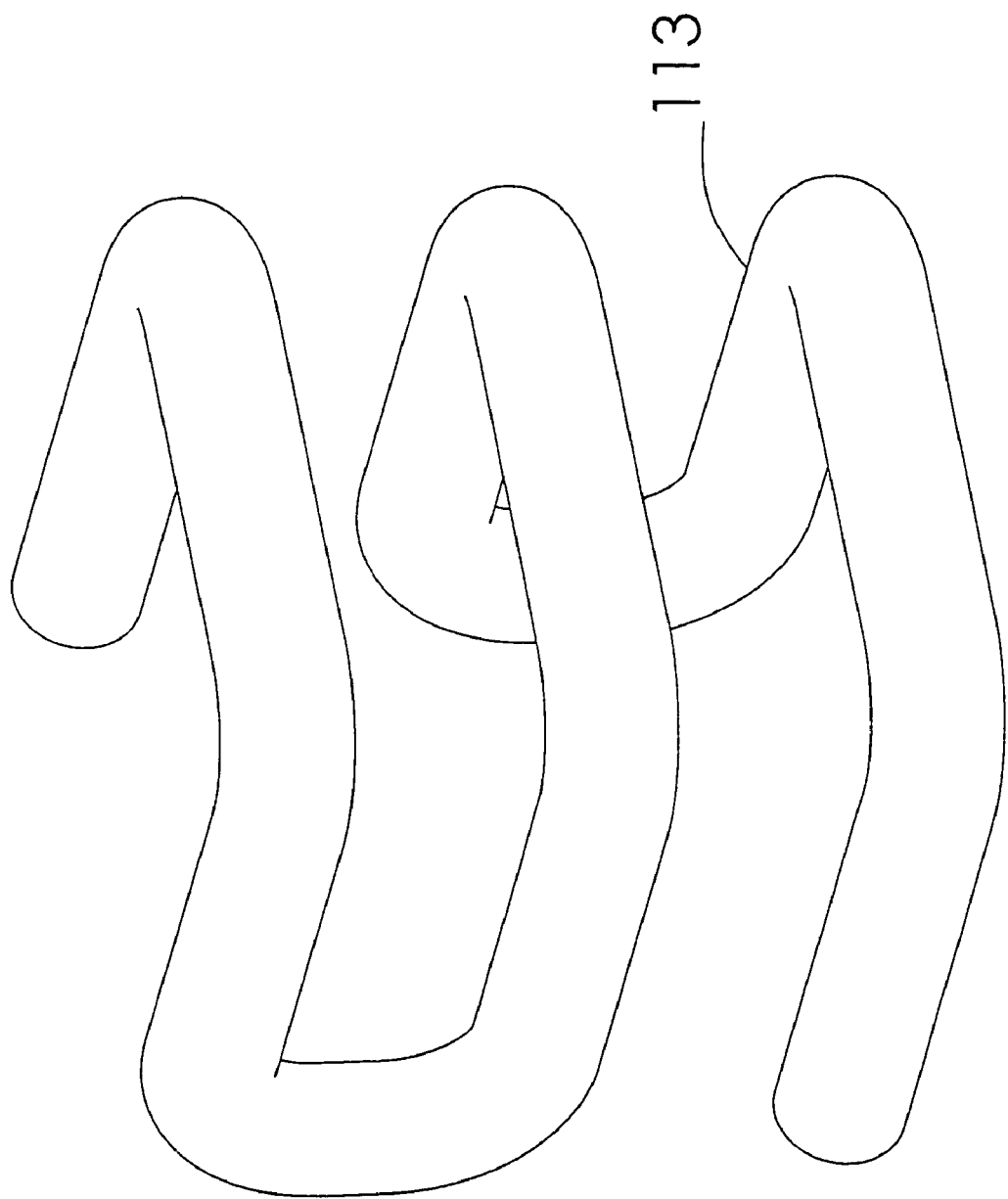

Referring to FIGS. 16A-16E, these shapes are 3 dimensional versions of the Lotus Shapes introduced in FIGS. 7A-7E and FIGS. 11. FIG. 16A is a 3 dimensional representation of an L shape 105 like that in FIG. 7D. FIG. 16B is a 3 dimensional representation of an O shape 107, like that in FIG. 7C. FIG. 16C is a 3 dimensional representation of a T shape 109 like that in FIGS. 11A-11C. FIG. 16D is a 3 dimensional representation of a U shape 111 like that in FIG. 7B and 7E. FIG. 16E is a 3 dimensional representation of an S shape 113 like that in FIG. 7A.

Figure 17:
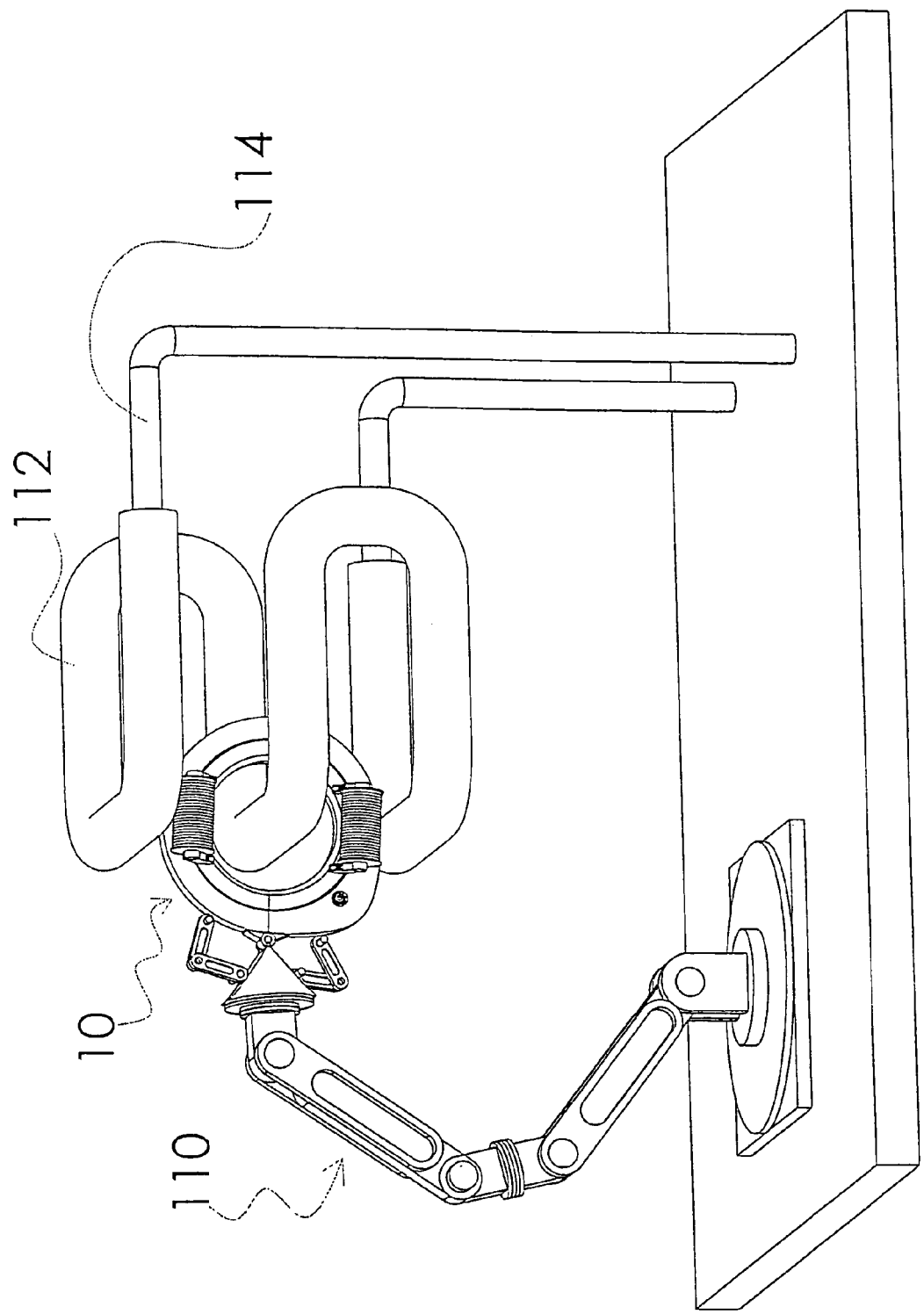
FIG. 17 is a perspective view of a centerless race and carrier wheel mounted to an articulated arm, in accordance with an embodiment of the present invention.

Referring to the embodiment shown in FIG. 17, the apparatus 10 is mounted to an articulated arm 110 while the workpiece 112 is mounted to a fixture 114.

Figure 18A:
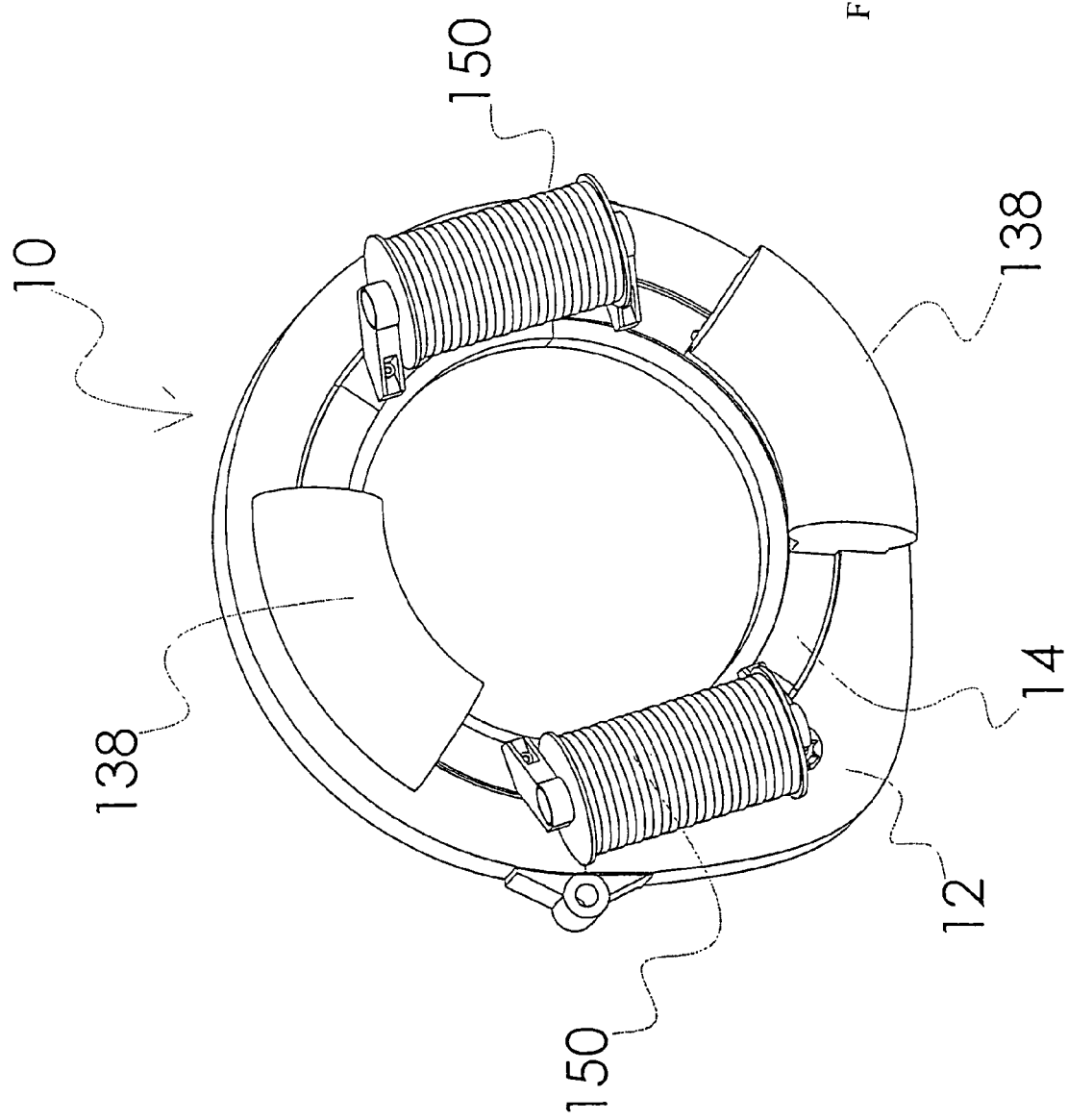
FIGS. 18A and 18B are perspective views of a centerless race and carrier wheel with a mounted reservoir, in accordance with an embodiment of the present invention.
Figure 18B:
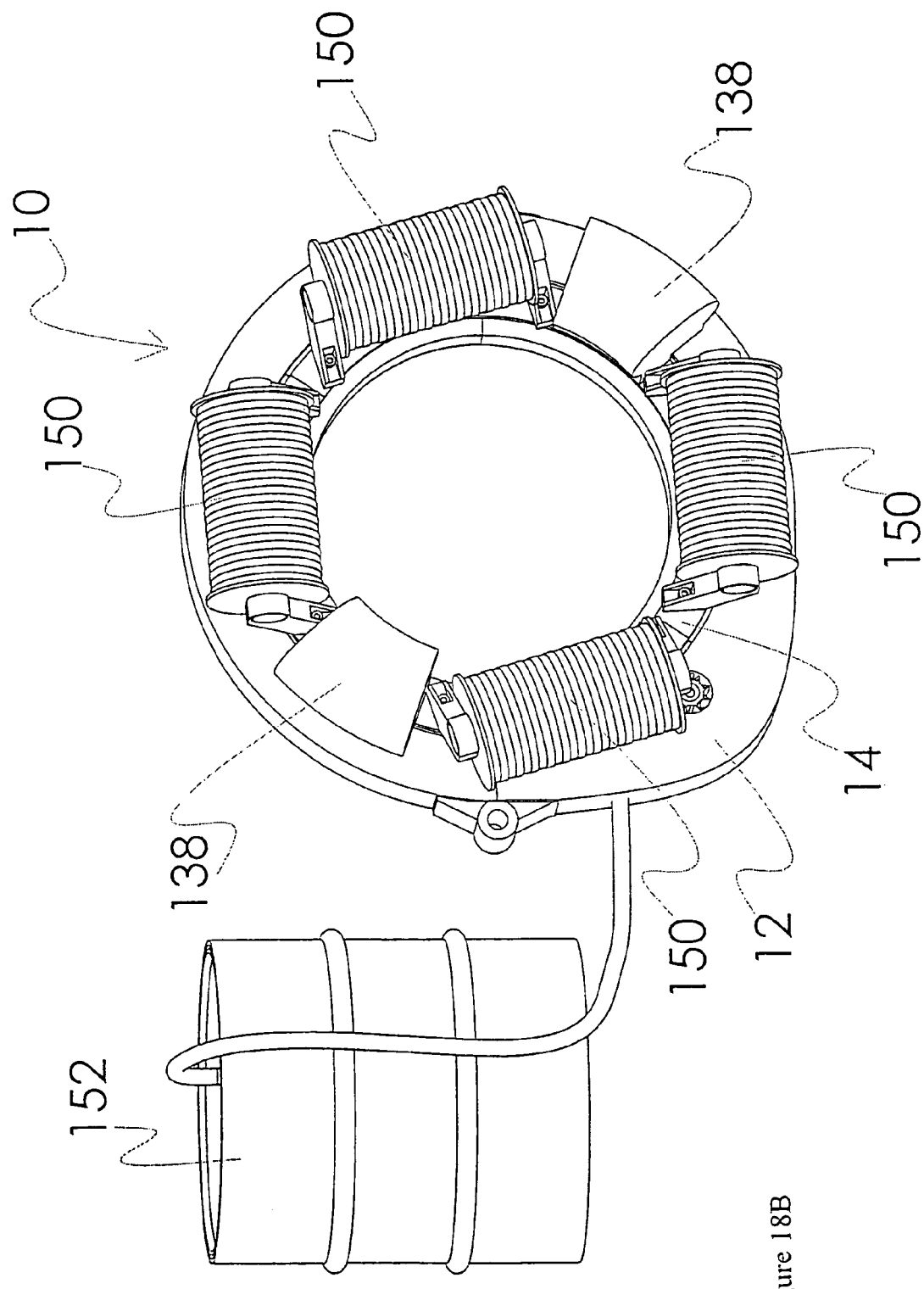

Referring to the embodiment shown in FIG. 18A, the apparatus 10 may be configured to do 'dry winding' by carrying a supply of resin in a reservoir 138 affixed on the carrier 14 along with dry fiber 150 on a spool 18. The resin may be applied to the dry fiber by means already practiced in the art, such as by rollers, by spray, by drawing the fibers through a bath of resin, etc. Referring to FIG. 18B, an apparatus 10 may be configured to do 'dry winding' by having a large remote reservoir 152 of resin and the resin drawn through the race 12 via a slip ring to the carrier 14 to the smaller reservoir 138 at which point the fiber may be wetted by means already practiced in the art.

Figure 19:
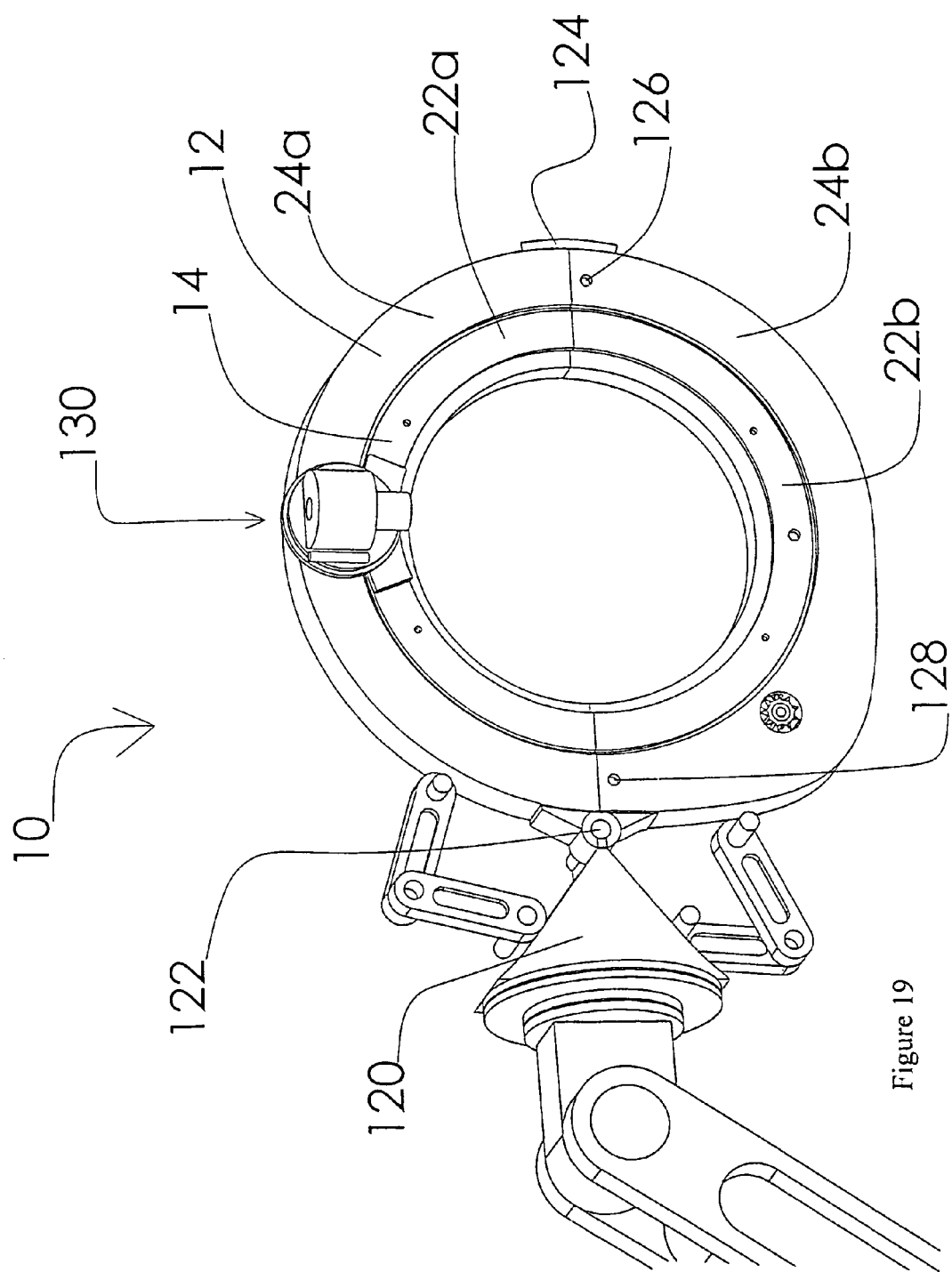
FIG. 19 is a perspective view of an electronically controlled centerless race and tool carrier, in accordance with an embodiment of the present invention.

Referring to the embodiment shown in FIG. 19, the apparatus 10 may include means for electrical control and sensing of the operation of the apparatus 10. In this embodiment, a device 120 automates opening and closing of the race 12 and carrier 14. In some embodiments, the device 120 is a gear driven device, hydraulic device, solenoid or like device. The device 120 may be positioned near a pivot point 122. A latch 124 may be electrically, hydraulically, or mechanically controlled to automatically secure and release the sections 24*a,* 24*b* of the race 12 to one another. A sensor 126 may detect whether the sections 24*a,* 24*b* of the race 12 have closed. A sensor 128 may detect the position of the sections 22*a,* 22*b* to, for example, determine whether they are aligned with the sections 24*a,* 24*b,* respectively, in order to determine whether the race 12 can be opened. A multi-axis tool control assembly 130 may secure to the carrier 14 and control movement of a tool in radial and lateral directions. A multi-axis tool control assembly 130 may also cause tool movement in the circumferential direction. Power and control signals may be delivered to the multi-axis tool control assembly 130 through "slip ring" conductive tracks along the carrier 14 which engage substantially stationary contact points on the race 12. Tracks for power input, control signal input, and ground may be provided, though additional tracks may also be used. For split carrier 14 and race 12, a "split slip ring" is ideal, while other conductive tracks used by those skilled in the art may also be effectively used.

Figure 20A:
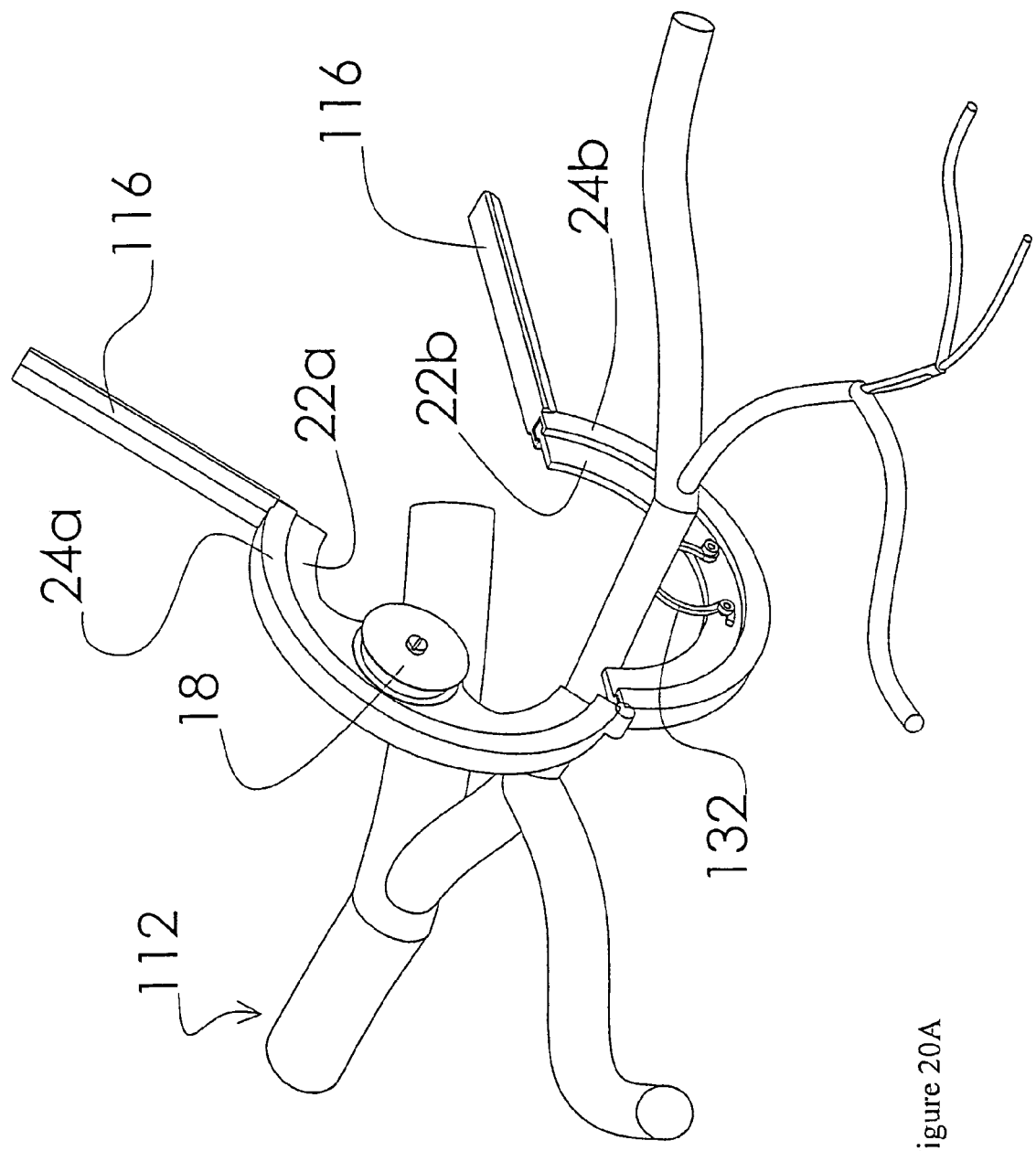
FIGS. 20A-20C are perspective views of a centerless race and tool carrier having a carrier ring mounted to the carrier thereof, in accordance with an embodiment of the present invention.
Figure 20B:
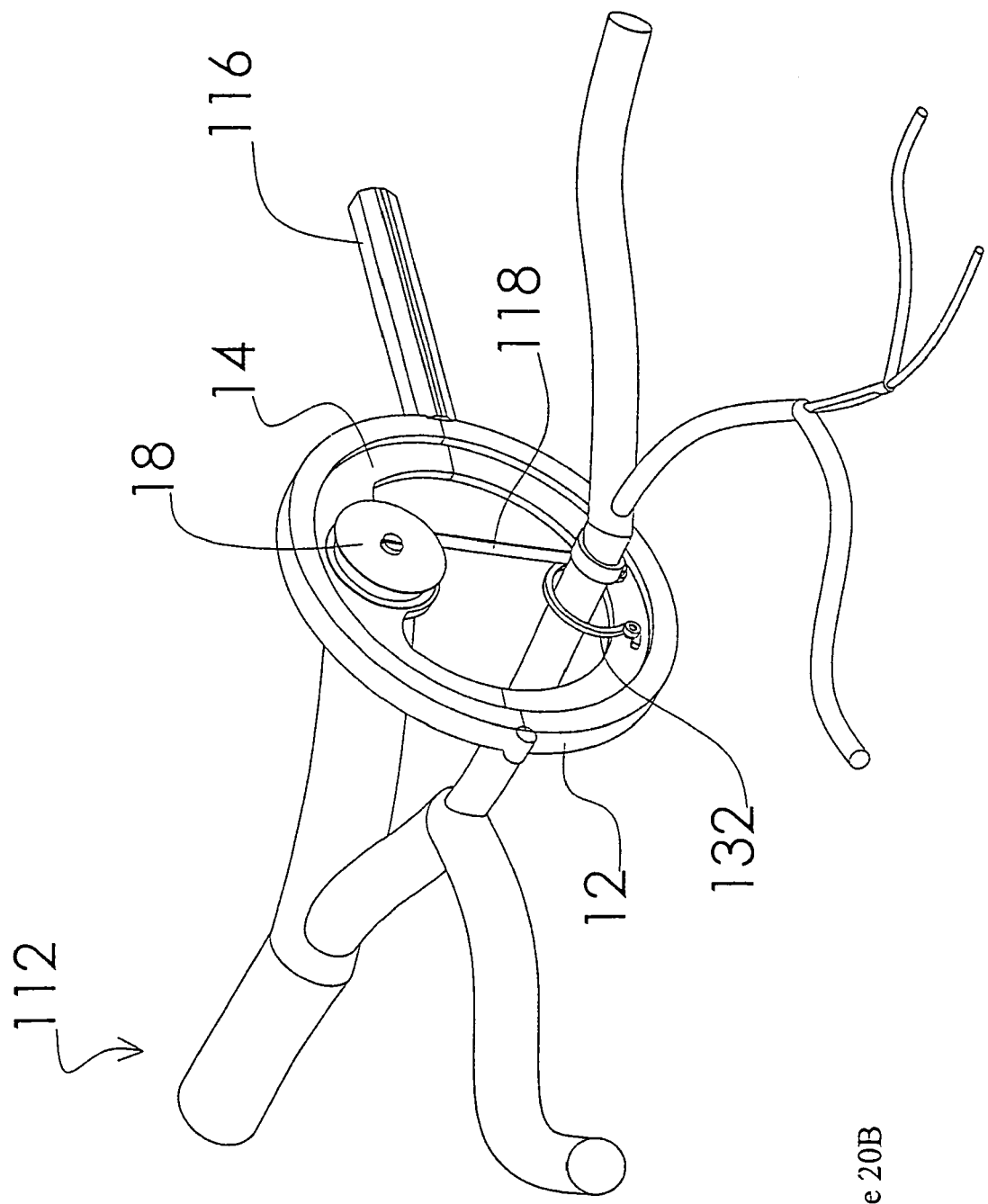
Figure 20C:
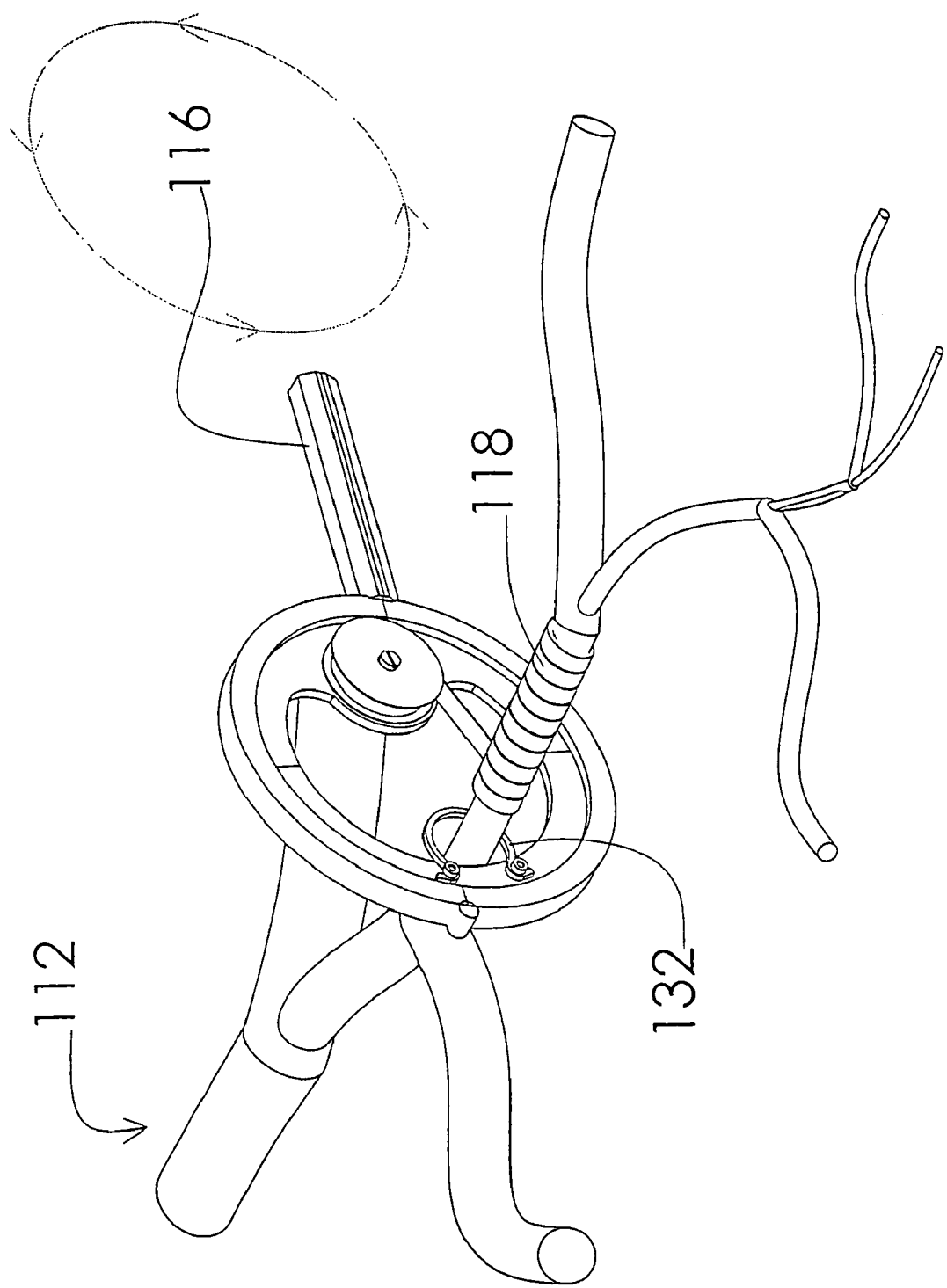

Referring to FIGS. 20A-20C, in one alternative embodiment a carrier ring 132 mounts to the carrier half 22*b* and spool 18 mounts to the carrier half 22*a.* Referring to FIG. 20A, the race halves 24*a* and 24*b* are affixed to handle halves 116 that can be opened and closed around a workpiece 112. Next, referring to FIG. 20B, a carrier ring 132 may be further positioned around the workpiece 112 and tape 118 may be attached to the workpiece 112. Referring to FIG. 20C, a handle 116 can be pushed and pulled by hand in a circular motion perpendicular to the workpiece 112 moving the machine 10 in a path parallel to the workpiece 112 such that rotation of the carrier 14 causes a tape or filament 118 to be drawn from the spool 18 and wrapped around the workpiece 112.

Figure 21:
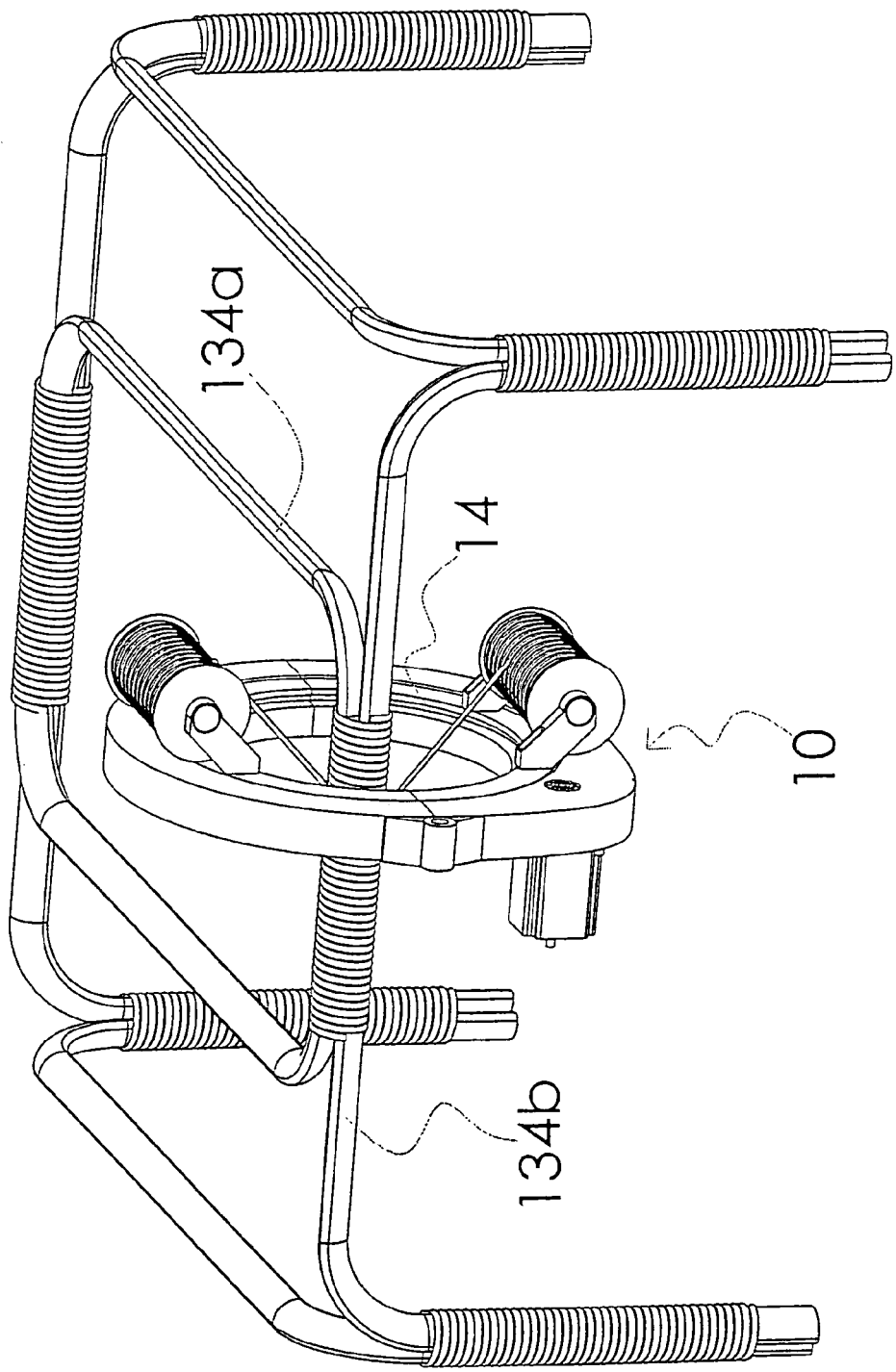
FIG. 21 is a perspective view of a centerless race and tool carrier lashing structures together, in accordance with an embodiment of the present invention.

Referring to FIG. 21, the ability of the apparatus 10 to open to receive closed loops may enable the apparatus 10 to serve a lashing function. For example, a closed shaped structure 134*a,* and a U shaped structure 134*b* may be positioned within the carrier 14 such that filament is simultaneously wound around both structures 134*a,* 134*b.* In some embodiments related to FIG., 21 the material being wrapped on the table may be a natural material such as rattan instead of aerospace composites.

Figure 22:
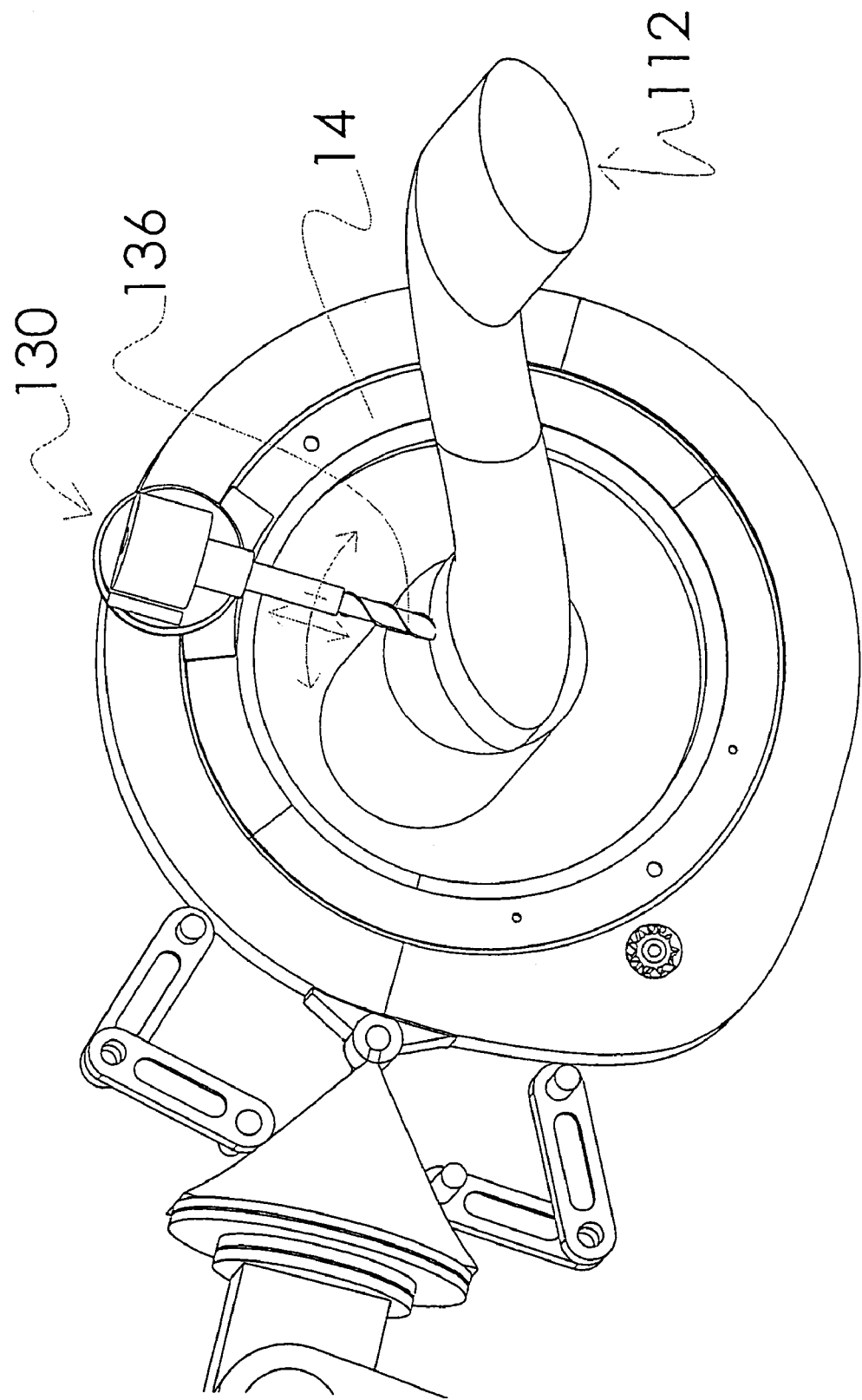
FIG. 22 is a perspective view of a centerless race and tool carrier bearing a cutting tool, in accordance with an embodiment of the present invention.

Referring to FIG. 22, various applications for the mobility and accessibility provided by the invention exist. For example, in this embodiment, a cutting tool 136, or other machining tool, may mount to the carrier 14 to remove material from workpiece 112. In some embodiments the tool 136 may be adjustable manually or automatically in a radial direction relative to the carrier 14.

Figure 23:
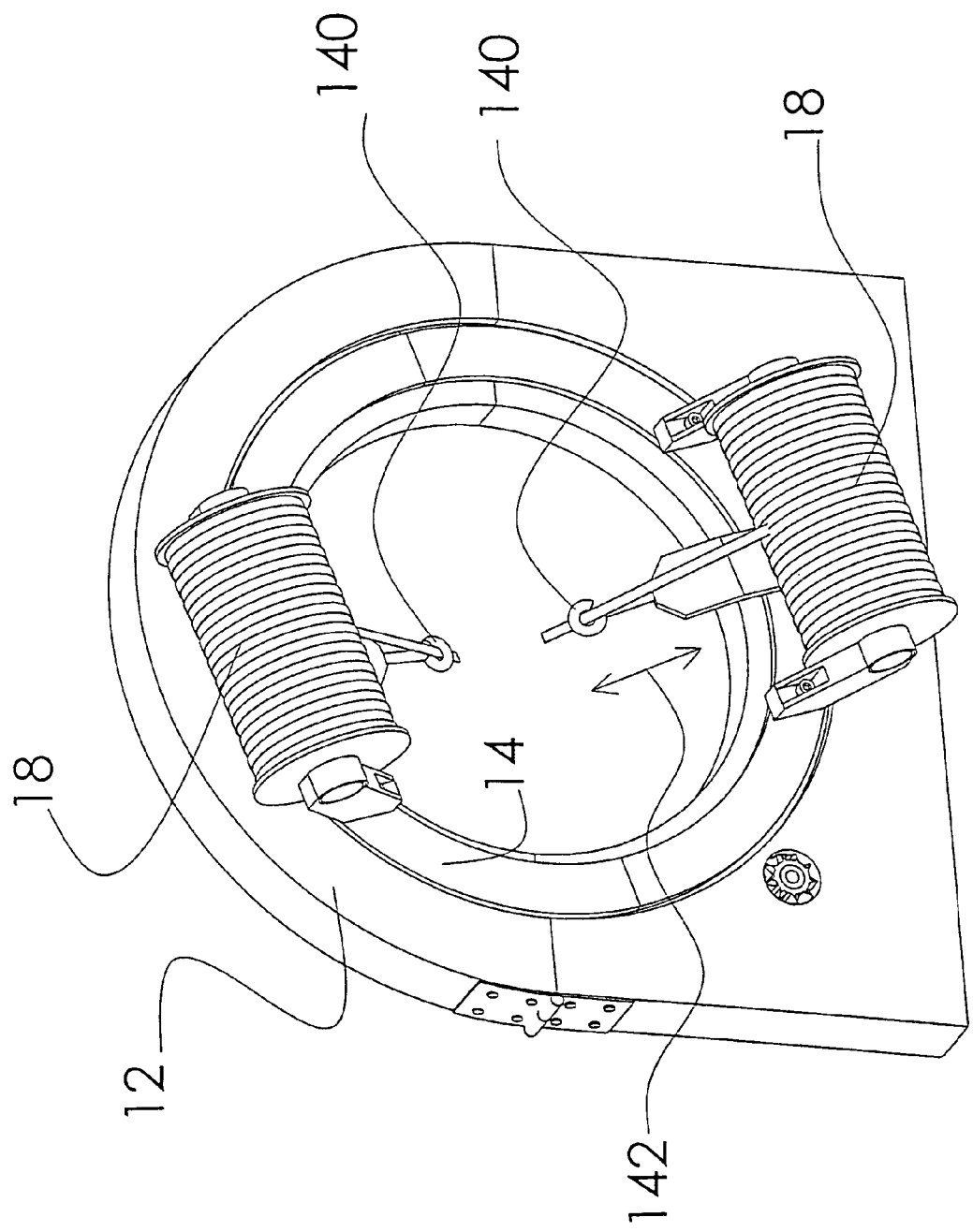
FIG. 23 is a perspective view of a centerless race and tool carrier bearing a filament guide, in accordance with an embodiment of the present invention.

Referring to FIG. 23, in some embodiments one or more eyelets 140 secures to the carrier 14 and guides the filament being drawn from the spool 18. The eyelet 140 may be spaced apart a distance 142 from the carrier 14. In some embodiments, the distance 142 is adjustable to accommodate parts of different sizes, and when mounted to the tool 136, can articulate to precisely place material on complex cross-sections.

Figure 24A:
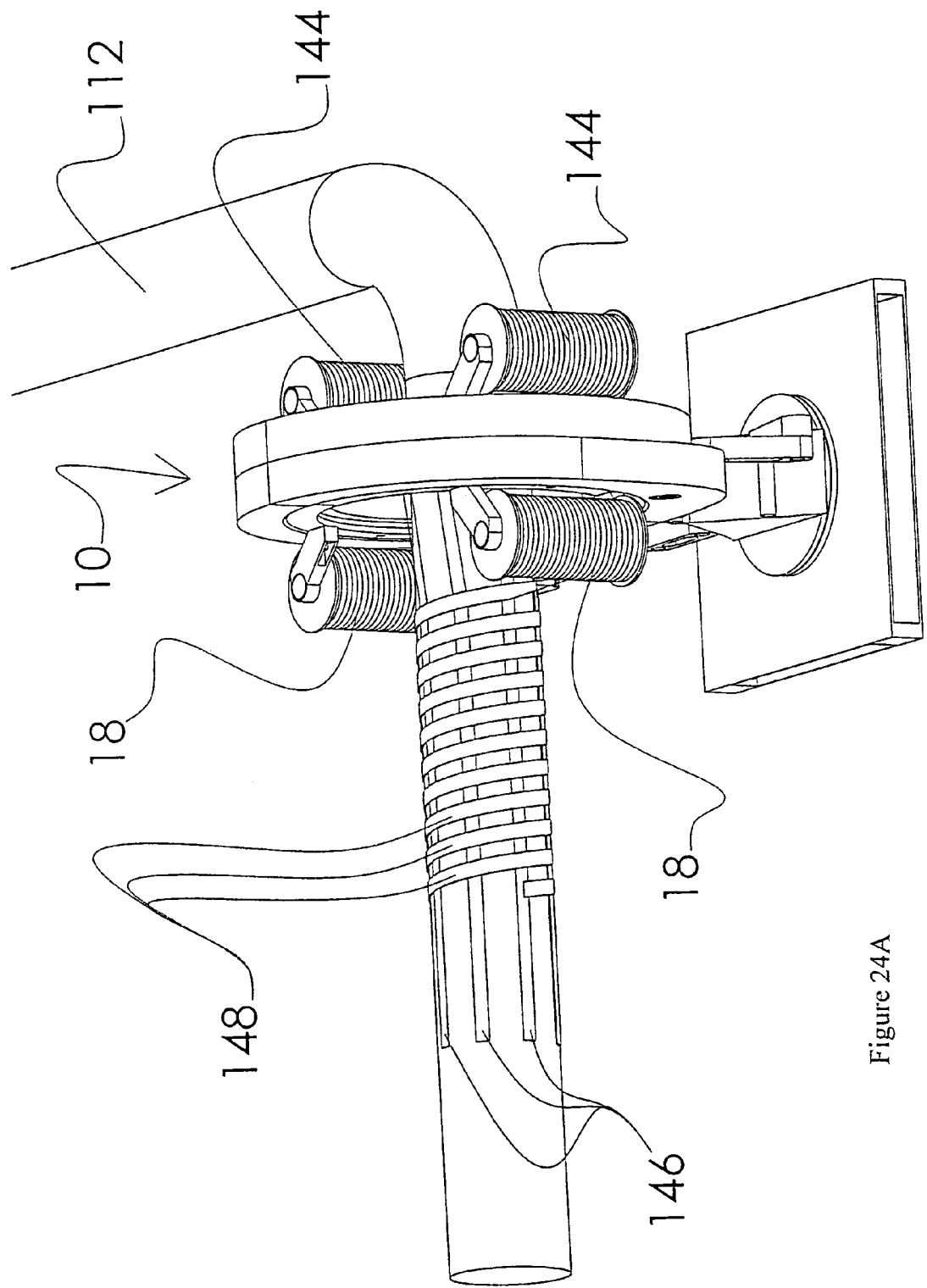
FIGS. 24A and 24B are perspective views of a centerless race and tool carrier having multiple winding directions, in accordance with an embodiment of the present invention.
Figure 24B:
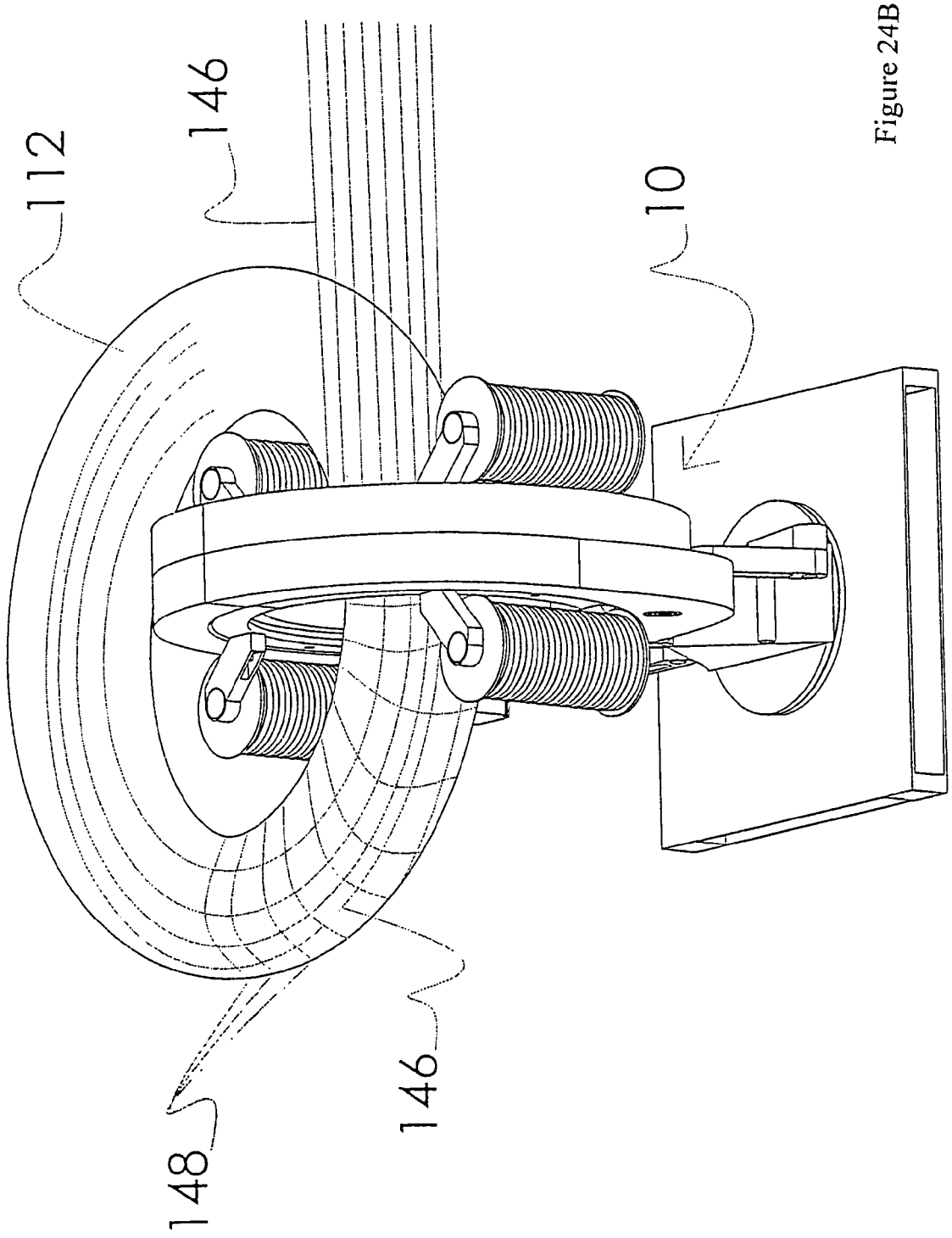

Referring to FIG. 24A, in one embodiment a second filament source deposits fibers parallel or substantially parallel to the direction of travel of the work piece 112 through the apparatus 10. For example, one or more spools 144 deposit fibers 146. The fibers 146 are lashed by fibers 148 deposited by the spools 18. The fibers 146 may be disposed at regular intervals around the workpiece 112. The position of the spools 144 relative to the workpiece 112 may change as the workpiece 112 is fed through to ensure deposition of fibers 146 over the entire circumference of the workpiece 112. For example the carrier bearing spools 144 is in its own race 12 and the carrier 14 bearing spools 18 is in its own race 14. These races are back to back and spin their separate carriers independent of each other. The carrier bearing spools 144 may rotate at a slower speed than the carrier bearing the spools 18 in order to deposit fibers at differing angles to build a part having improved structural properties. Referring to FIG. 24B, zero degree fibers 146, coming from a remote source of much larger capacity, may be placed on the workpiece 112 and then those fibers may be overwound by fibers 148 placed by apparatus 10.

Those of ordinary skill in the art will, of course, appreciate that various modifications to the details illustrated in the schematic diagrams of FIGS. 1 through 24 may easily be made without departing from the essential characteristics of the invention. Thus, the foregoing description is intended only as an example, and simply illustrates several presently preferred embodiments consistent with the invention as claimed herein.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. An apparatus for laying up filaments, the apparatus comprising:
    a race comprising a fixed portion secured to a support structure and defining a first arcuate path forming a first angular portion of a circular path, and a hinged portion, hingedly secured to the fixed portion and defining a second arcuate path forming a second angular portion of the circular path;
    a carrier forming a circular structure positioned within the circular path, the carrier comprising a first carrier portion sized to occupy a substantial portion of the first arcuate path and a second carrier portion sized to occupy a substantial portion of the second arcuate path;
    a driver secured to the fixed portion and sequentially engaging the first and second carrier portions to move the first and second carrier portions within the circular path; and
    at least one filament source secured to at least one of the first carrier portion and the second carrier portion.

2. The apparatus of claim 1, wherein the filament is carbon fiber.

3. The apparatus of claim 2, wherein the first carrier portion and second carrier portion each comprise a grippable outer edge.

4. The apparatus of claim 3, wherein the grippable outer edge comprises gear teeth.

5. The apparatus of claim 1, wherein the first and second angular portion are each approximately 180 degrees.

6. The apparatus of claim 1, wherein the carrier forms a non-circular structure.

7. A method for laying up a filament, the method comprising
    providing a race comprising a fixed portion secured to a support structure and defining a first arcuate path forming a first angular portion of a circular path, a hinged portion, hingedly secured to the fixed portion and defining a second arcuate path forming a second angular portion of the circular path;
    providing a carrier forming a circular structure positioned within the circular path, the carrier comprising a first carrier portion sized to occupy substantially all of the first arcuate path and a second carrier portion sized to occupy substantially all of the second arcuate path;
    providing a driver secured to the fixed portion and sequentially engaging the first and second carrier portions to move the first and second carrier portions within the circular path;
    providing at least one filament source secured to at least one of the first carrier portion and the second carrier portion;
    rotating the hinged portion to open the race;
    positioning a work piece within the race;
    rotating the hinged portion to close the race;
    securing an initial portion of filament from the filament source to the workpiece; and
    activating the driver to cause the filament source to rotate about the workpiece.

8. The method of claim 7, wherein the workpiece is T-shaped, having first, second, and third branches secured at an apex, the method further comprising
    positioning the first branch within the race;
    rotating the hinged portion to open the race;
    positioning the second branch within the race; and
    rotating the hinged portion to close the race.

9. The method of claim 8, further comprising, positioning the apex within the race and winding filament thereabout.

* * * * *